US009510646B2

(12) United States Patent
Holt

(10) Patent No.: US 9,510,646 B2
(45) Date of Patent: Dec. 6, 2016

(54) ARTICLE OF FOOTWEAR HAVING A FLEXIBLE FLUID-FILLED CHAMBER

(75) Inventor: Scott C. Holt, Portland, OR (US)

(73) Assignee: NIKE, Inc., Beaverton, OR (US)

(*) Notice: Subject to any disclaimer, the term of this patent is extended or adjusted under 35 U.S.C. 154(b) by 701 days.

(21) Appl. No.: 13/551,434

(22) Filed: Jul. 17, 2012

(65) Prior Publication Data

US 2014/0020264 A1 Jan. 23, 2014

(51) Int. Cl.
| | |
|---|---|
| *A43B 13/20* | (2006.01) |
| *A43B 13/38* | (2006.01) |
| *A43B 23/00* | (2006.01) |
| *A43B 13/18* | (2006.01) |
| *A43B 7/14* | (2006.01) |
| *A43B 13/40* | (2006.01) |
| *A43B 17/03* | (2006.01) |

(52) U.S. Cl.
CPC ......... *A43B 13/189* (2013.01); *A43B 7/1465* (2013.01); *A43B 13/20* (2013.01); *A43B 13/40* (2013.01); *A43B 17/035* (2013.01)

(58) Field of Classification Search
CPC ....... A43B 13/189; A43B 13/20; A43B 13/40; A43B 13/206; A43B 7/1465; A43B 7/28; A43B 7/32; A43B 5/0407; A43B 17/035; A43B 17/026; A43B 17/03; A43B 21/28; A43B 21/285; A43B 23/029
USPC .............................. 36/28, 29, 35 R, 35 B, 43
See application file for complete search history.

(56) References Cited

U.S. PATENT DOCUMENTS

| | | | |
|---|---|---|---|
| 500,385 A | 6/1893 | Hall | |
| 1,193,608 A | * 8/1916 | Poulson | 36/153 |
| 1,304,915 A | * 5/1919 | Spinney | A43B 17/03 36/153 |
| 2,155,166 A | 4/1939 | Kraft | |
| 2,188,168 A | 1/1940 | Winkel | |

(Continued)

FOREIGN PATENT DOCUMENTS

| | | |
|---|---|---|
| CN | 1372443 A | 10/2002 |
| DE | 24 60 034 A1 | 6/1976 |

(Continued)

OTHER PUBLICATIONS

International Search Report and Written Opinion of PCT/US2013/050623 dated Nov. 7, 2013.

(Continued)

*Primary Examiner* — Anna Kinsaul
*Assistant Examiner* — Jameson Collier
(74) *Attorney, Agent, or Firm* — Honigman Miller Schwartz and Cohn LLP; Matthew H. Szalach; Jonathan P. O'Brien

(57) ABSTRACT

An article of footwear may include an upper forming a void within the footwear, a sole structure secured to the upper, and a chamber that encloses a pressurized fluid. The sole structure includes a depression. The chamber is located within the void of the upper and located on the depression of the sole structure. The chamber may include a plurality of fluid-filled subchambers, a manifold, and a connection fluidically-connected at least one of the subchambers to the manifold. The subchambers may enclose the pressurized fluid at different pressures. The subchambers may be separated from one another by a bonded area in the direction extending between the heel and toe of the chamber.

17 Claims, 24 Drawing Sheets

(56) References Cited

U.S. PATENT DOCUMENTS

| | | | |
|---|---|---|---|
| 2,224,590 A | 12/1940 | Boivin | |
| 3,087,261 A | 4/1963 | Russell | |
| 3,253,355 A | 5/1966 | Menken | |
| 3,683,431 A | 8/1972 | Pennel et al. | |
| 3,765,422 A * | 10/1973 | Smith | 36/153 |
| 3,795,994 A * | 3/1974 | Ava | 36/29 |
| 4,059,910 A | 11/1977 | Bryden et al. | |
| 4,183,156 A | 1/1980 | Rudy | |
| 4,217,705 A | 8/1980 | Donzis | |
| 4,219,945 A | 9/1980 | Rudy | |
| 4,241,524 A | 12/1980 | Sink | |
| 4,265,032 A | 5/1981 | Levine | |
| 4,287,250 A | 9/1981 | Rudy | |
| 4,302,892 A | 12/1981 | Adamik | |
| 4,309,831 A | 1/1982 | Pritt | |
| 4,309,832 A | 1/1982 | Hunt | |
| 4,340,626 A | 7/1982 | Rudy | |
| 4,506,461 A | 3/1985 | Inohara | |
| 4,638,577 A | 1/1987 | Riggs | |
| D288,027 S | 2/1987 | Tonkel | |
| D294,537 S | 3/1988 | Le | |
| D294,653 S | 3/1988 | Le | |
| 4,782,603 A * | 11/1988 | Brown | 36/29 |
| 4,845,861 A * | 7/1989 | Moumdjian | 36/29 |
| 4,906,502 A | 3/1990 | Rudy | |
| 4,908,964 A | 3/1990 | Deem | |
| 4,936,029 A | 6/1990 | Rudy | |
| 4,999,931 A * | 3/1991 | Vermeulen | 36/29 |
| 5,025,575 A * | 6/1991 | Lakic | 36/44 |
| 5,042,176 A | 8/1991 | Rudy et al. | |
| 5,083,361 A | 1/1992 | Rudy | |
| 5,179,792 A * | 1/1993 | Brantingham | 36/29 |
| 5,230,249 A * | 7/1993 | Sasaki et al. | 73/714 |
| 5,313,717 A * | 5/1994 | Allen et al. | 36/28 |
| 5,369,896 A | 12/1994 | Frachey et al. | |
| 5,425,184 A | 6/1995 | Lyden et al. | |
| 5,572,804 A | 11/1996 | Skaja et al. | |
| D378,472 S | 3/1997 | Bramani | |
| 5,625,964 A | 5/1997 | Lyden et al. | |
| 5,713,141 A | 2/1998 | Mitchell et al. | |
| D396,342 S | 7/1998 | Foxen et al. | |
| 5,784,808 A | 7/1998 | Hockerson | |
| 5,794,359 A * | 8/1998 | Jenkins et al. | 36/28 |
| 5,832,630 A * | 11/1998 | Potter | A43B 13/203 36/28 |
| 5,875,571 A | 3/1999 | Huang | |
| 5,915,820 A | 6/1999 | Kraeuter et al. | |
| 5,952,065 A | 9/1999 | Mitchell et al. | |
| 5,976,451 A | 11/1999 | Skaja et al. | |
| 5,987,781 A | 11/1999 | Pavesi et al. | |
| 5,993,585 A | 11/1999 | Goodwin et al. | |
| 6,013,340 A | 1/2000 | Bonk et al. | |
| 6,029,962 A | 2/2000 | Shorten et al. | |
| D421,832 S | 3/2000 | Loveder | |
| 6,041,521 A | 3/2000 | Wong | |
| 6,065,230 A | 5/2000 | James | |
| 6,079,126 A | 6/2000 | Olszewski | |
| 6,082,025 A | 7/2000 | Bonk et al. | |
| 6,092,310 A * | 7/2000 | Schoesler | 36/43 |
| 6,098,313 A | 8/2000 | Skaja | |
| 6,115,945 A | 9/2000 | Ellis et al. | |
| 6,119,371 A | 9/2000 | Goodwin et al. | |
| 6,122,785 A * | 9/2000 | Bondie et al. | 5/709 |
| 6,127,026 A | 10/2000 | Bonk et al. | |
| 6,138,382 A * | 10/2000 | Schoesler | 36/43 |
| 6,178,663 B1 | 1/2001 | Schoesler | |
| 6,203,868 B1 | 3/2001 | Bonk et al. | |
| 6,205,682 B1 | 3/2001 | Park | |
| 6,321,465 B1 | 11/2001 | Bonk et al. | |
| 6,430,843 B1 * | 8/2002 | Potter | A43B 3/0005 36/28 |
| 6,487,795 B1 | 12/2002 | Ellis, III | |
| 6,505,420 B1 * | 1/2003 | Litchfield et al. | 36/29 |
| 6,571,490 B2 * | 6/2003 | Scarfe et al. | 36/29 |
| 6,773,785 B1 * | 8/2004 | Huang | 428/68 |
| 6,837,951 B2 | 1/2005 | Rapaport | |
| 6,883,253 B2 | 4/2005 | Smith et al. | |
| 6,900,755 B2 | 5/2005 | Richardson et al. | |
| 7,070,845 B2 | 7/2006 | Thomas et al. | |
| 7,168,190 B1 | 1/2007 | Gillespie | |
| 7,386,946 B2 | 6/2008 | Goodwin | |
| 7,451,555 B1 * | 11/2008 | Lakic | A43B 7/141 36/29 |
| 7,555,851 B2 | 7/2009 | Hazenberg et al. | |
| 7,600,332 B2 * | 10/2009 | Lafortune | 36/43 |
| 2002/0121031 A1 | 9/2002 | Smith et al. | |
| 2003/0046830 A1 | 3/2003 | Ellis, III | |
| 2003/0097767 A1 | 5/2003 | Perkinson | |
| 2003/0183324 A1 | 10/2003 | Tawney et al. | |
| 2005/0076536 A1 | 4/2005 | Hatfield et al. | |
| 2005/0097777 A1 | 5/2005 | Goodwin | |
| 2005/0132617 A1 | 6/2005 | Potter et al. | |
| 2006/0156575 A1 * | 7/2006 | Lo | 36/3 B |
| 2007/0169379 A1 | 7/2007 | Hazenberg et al. | |
| 2009/0151195 A1 | 6/2009 | Forstrom et al. | |
| 2011/0088281 A1 * | 4/2011 | Farina | A43B 13/12 36/29 |

FOREIGN PATENT DOCUMENTS

| | | |
|---|---|---|
| EP | 1002475 | 5/2000 |
| GB | 2 050 145 A | 1/1981 |
| GB | 2340378 | 2/2000 |
| WO | WO9103180 | 3/1991 |
| WO | WO9105491 | 5/1991 |
| WO | WO9111924 | 8/1991 |
| WO | WO9119429 | 12/1991 |
| WO | WO9207483 | 5/1992 |
| WO | WO9403080 | 2/1994 |

OTHER PUBLICATIONS

State Intellectual Property Office, Chinese Office Action for Application No. 201380037911.5, mailed Sep. 21, 2015.

Korean Patent Office, Korean Office Action for Application No. 10-2015-7004107, Mailed May 20, 2016.

* cited by examiner

ARTICLE OF FOOTWEAR HAVING A FLEXIBLE FLUID-FILLED CHAMBER

BACKGROUND

Articles of footwear generally include two primary elements: an upper and a sole structure. The upper is often formed from a plurality of material elements (e.g., textiles, polymer sheet layers, polymer foam layers, leather, synthetic leather) that are stitched or adhesively bonded together to form a void within the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust the fit of the footwear, as well as permitting entry and removal of the foot from the void within the upper. In addition, the upper may include a tongue that extends under the lacing system to enhance adjustability and comfort of the footwear, and the upper may incorporate a heel counter for stabilizing the heel area of the foot.

The sole structure is secured to a lower portion of the upper and positioned between the foot and the ground. In athletic footwear, for example, the sole structure often includes a midsole and an outsole. The midsole may be formed from a polymer foam material that attenuates ground reaction forces (i.e., provides cushioning) during walking, running, and other ambulatory activities. The midsole may also include fluid-filled chambers, plates, moderators, or other elements that further attenuate forces, enhance stability, or influence the motions of the foot, for example. In some configurations, the midsole may be primarily formed from a fluid-filled chamber. The outsole forms a ground-contacting element of the footwear and is usually fashioned from a durable and wear-resistant rubber material that includes texturing to impart traction. The sole structure may also include a sockliner positioned within the void of the upper and proximal a lower surface of the foot to enhance footwear comfort.

One manner of reducing the weight of a polymer foam midsole and decreasing the effects of deterioration following repeated compressions is disclosed in U.S. Pat. No. 4,183,156 to Rudy, hereby incorporated by reference, in which ground reaction force attenuation is provided by a fluid-filled chamber formed of an elastomeric material. The chamber includes a plurality of tubular chambers that extend longitudinally along a length of the sole structure. The chambers are in fluid communication with each other and jointly extend across the width of the footwear. The chamber may be encapsulated in a polymer foam material, as disclosed in U.S. Pat. No. 4,219,945 to Rudy, hereby incorporated by reference. The combination of the chamber and the encapsulating polymer foam material functions as a midsole. Accordingly, the upper is attached to the upper surface of the polymer foam material and an outsole or tread member is affixed to the lower surface. Chambers of the type discussed above are generally formed of an elastomeric material and are structured to have an upper and lower portions that enclose one or more chambers therebetween. The chambers are pressurized above ambient pressure by inserting a nozzle or needle connected to a fluid pressure source into a fill inlet formed in the chamber. Following pressurization of the chambers, the fill inlet is sealed and the nozzle is removed.

Fluid-filled chambers suitable for footwear applications may be manufactured by a flat-film bonding technique, in which two separate polymer sheets, possibly an elastomeric film, are bonded together along their respective peripheries to form a sealed structure, and the sheets are also bonded together at predetermined interior areas to give the chamber a desired configuration. That is, the interior bonds provide the chamber with a predetermined shape and size when inflated. In a thermoforming process, the sheets may also be heated and molded to impart a pre-determined shape. Such chambers have also been manufactured by blowmolding, wherein a molten or otherwise softened elastomeric material in the shape of a tube is placed in a mold having the desired overall shape and configuration of the chamber. The mold has an opening at one location through which pressurized air is provided. The pressurized air induces the liquefied elastomeric material to conform to the shape of the inner surfaces of the mold. The elastomeric material then cools, thereby forming a chamber with the desired shape and configuration.

SUMMARY

According to one configuration, an article of footwear may include an upper forming a first portion of a void within the footwear. The article of footwear may further include a sole structure secured to the upper. The sole structure may include a depression that forms a second portion of the void. The article of footwear may further include a chamber that encloses a pressurized fluid. The chamber may be located within the depression. The chamber may include a plurality of fluid-filled subchambers that extend in a medial to lateral direction of the footwear. At least two of the subchambers may be isolated from fluid communication with each other.

According to another configuration, an article of footwear includes an upper forming a first portion of a void within the footwear. The upper may include an ankle opening that provides access to the void. The article of footwear may further include a sole structure secured to the upper. The sole structure may include a depression that forms a second portion of the void. The article of footwear may further include a chamber that encloses a pressurized fluid. The chamber may be located within the depression. The article of footwear may further include an insert located on a top surface of the chamber and being at least partially formed from a polymer foam material. The chamber and the insert may be removable from the void through the ankle opening.

According to another configuration, a method of manufacturing a chamber enclosing a pressurized fluid includes placing a first sheet and a second sheet within a mold. The mold is closed to form a bonded area between the first sheet and the second sheet and at least one chamber, wherein the chamber includes a plurality of subchambers and a manifold fluidically-connected to at least two of the subchambers. A pressurized fluid is supplied at a first pressure to the manifold so that the two subchambers are inflated with the pressurized fluid. A connection fluidically-connecting the manifold to a first subchamber of the two subchambers is first sealed to seal the pressurized fluid within the first subchamber. A pressurized fluid is supplied at a second pressure to the manifold so that a second subchamber of the two subchambers is inflated with the pressurized fluid. A connection fluidically-connecting the manifold to the second subchamber is second sealed to seal the pressurized fluid within the second subchamber.

According to another configuration, an article of footwear may include an upper, a sole structure, and a chamber. The upper may form a first portion of a void within the footwear. The upper may include an ankle opening that provides access to the void. The sole structure may be secured to the upper. The sole structure may include a depression that forms a second portion of the void. The chamber may enclose a pressurized fluid. The chamber may be located within the depression. The chamber may include a plurality of fluid-filled subchambers that extend in a medial to lateral direction of the footwear. The chamber may include a manifold in fluid communication with the subchambers. The chamber may include bonds that extend in the medial to lateral direction and are located between the subchambers. The chamber may be removable from the article of footwear through the ankle opening.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

DETAILED DESCRIPTION

The following discussion and accompanying figures disclose various configurations of an article of footwear having a sole structure. Although the footwear is disclosed as having a configuration that is suitable for running, concepts associated with the footwear may be applied to a wide range of athletic footwear styles, including basketball shoes, cross-training shoes, football shoes, golf shoes, hiking shoes and boots, ski and snowboarding boots, soccer shoes, tennis shoes, and walking shoes, for example. Concepts associated with the footwear may also be utilized with footwear styles that are generally considered to be non-athletic, including dress shoes, loafers, and sandals. Accordingly, the concepts disclosed herein may be utilized with a variety of footwear styles.

Figure 1:
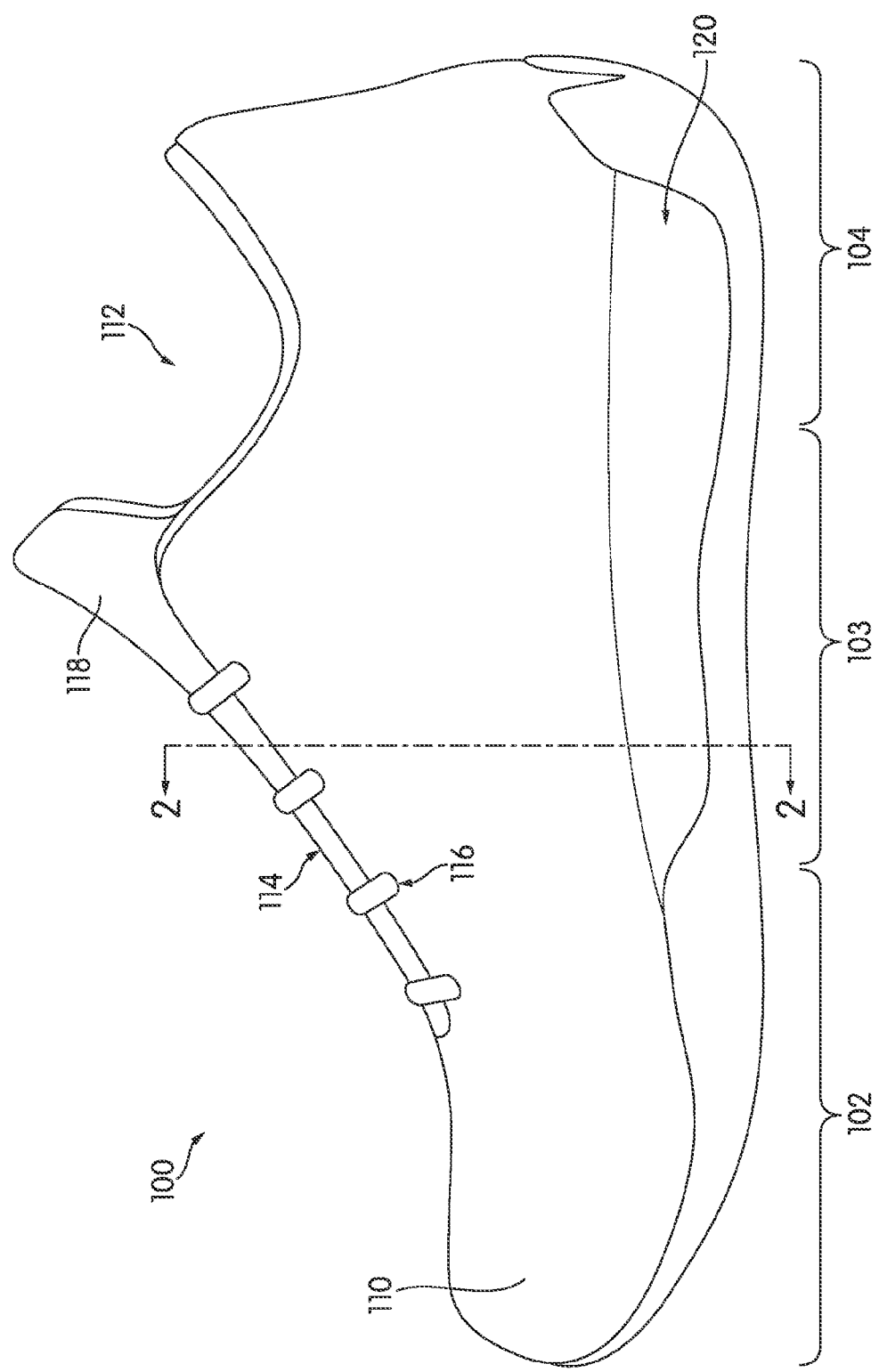
FIG. 1 is a side elevational view of an article of footwear.

An article of footwear 100 is depicted in FIG. 1 as including an upper 110 and a sole structure 120. Upper 110 provides a comfortable and secure covering for a foot of a wearer. As such, the foot may be located within upper 110 to effectively secure the foot within footwear 100. Sole structure 120 is secured to a lower area of upper 110 and extends between upper 110 and the ground. When the foot is located within upper 110, sole structure 120 extends under the foot to attenuate ground reaction forces (i.e., cushion the foot), provide traction, enhance stability, and influence the motions of the foot, for example.

Figure 2:
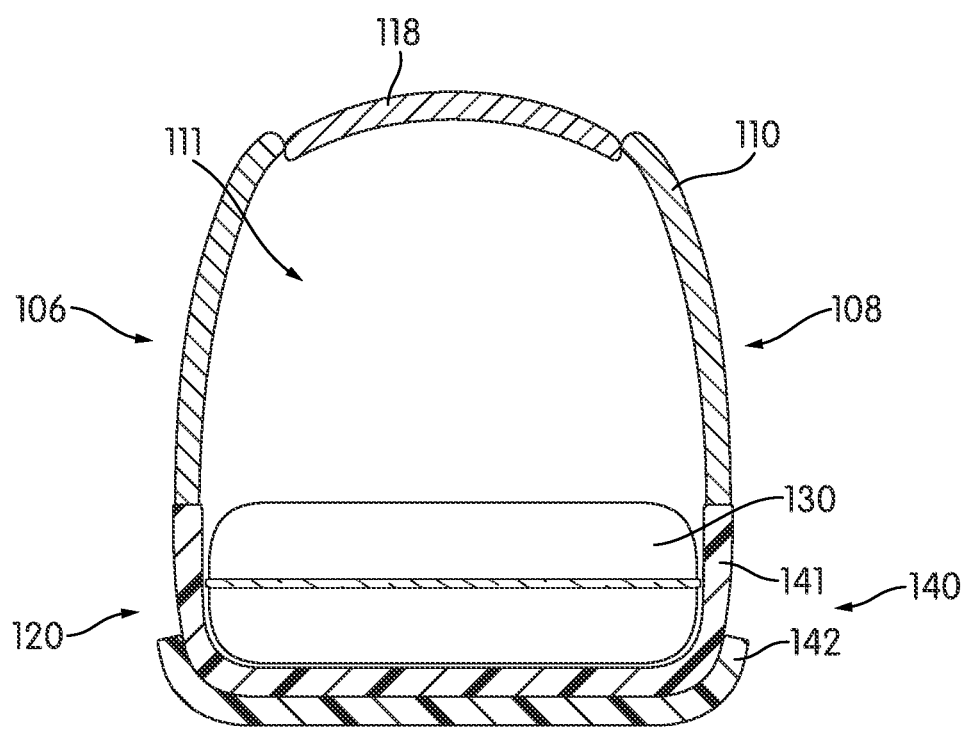
FIG. 2 is a cross-sectional view of the article of footwear along line 2-2 of FIG. 1.

For purposes of reference in the following discussion, footwear 100 may be divided into three general regions: a forefoot region 102, a midfoot region 103, and a heel region 104. Forefoot region 102 generally includes portions of footwear 100 corresponding with the toes and the joints connecting the metatarsals with the phalanges. Midfoot region 103 generally includes portions of footwear 100 corresponding with an arch area of the foot. Heel region 104 generally corresponds with rear portions of the foot, including the calcaneus bone. Footwear 100 also includes a medial side 106 and a lateral side 108, as shown in FIG. 2, which extend through each of regions 102-104 and correspond with opposite sides of footwear 100. More particularly, lateral side 108 corresponds with an outside area of the foot (i.e. the surface that faces away from the other foot), and medial side 106 corresponds with an inside area of the foot (i.e., the surface that faces toward the other foot).

Regions 102, 103, 104 and sides 106, 108 are not intended to demarcate precise areas of footwear 100. Rather, regions 102, 103, 104 and sides 106, 108 are intended to represent general areas of footwear 100 to aid in the following discussion. In addition to footwear 100, regions 102, 103, 104 and sides 106, 108 may also be applied to upper 110, sole structure 120, and individual elements thereof.

Upper 110 is depicted as having a substantially conventional configuration formed from a variety of elements (e.g., textiles, polymer sheet layers, polymer foam layers, leather, synthetic leather) that are stitched, bonded, or otherwise joined together to provide a structure for receiving and securing the foot relative to sole structure 120. The various elements of upper 110 define a portion of a void 111 within footwear 100 that is intended to receive the foot. As such, upper 110 extends along the lateral side 108 of the foot, along the medial side 106 of the foot, over the foot, around a heel of the foot, and under the foot. Access to void 111 is provided by an ankle opening 112 located in at least the heel region 104 of the footwear 100. A lace 114 extends through various lace apertures 116 and permits the wearer to modify dimensions of upper 110 to accommodate the proportions of the foot. More particularly, lace 114 permits the wearer to tighten upper 110 around the foot, and lace 114 permits the wearer to loosen upper 110 to facilitate entry and removal of the foot from void 111 (i.e., through ankle opening 112). As an alternative to lace apertures 116, upper 110 may include other lace-receiving elements, such as loops, eyelets, hooks, and D-rings. In addition, upper 110 includes a tongue 118 that extends between void and lace 114 to enhance the comfort and adjustability of footwear 100. In some configurations, upper 110 may incorporate other elements, such as reinforcing members, aesthetic features, a heel counter that limits heel movement in the heel of the footwear, a wear-resistant toe guard located in the forefoot of the footwear, or indicia (e.g., a trademark) identifying the manufacturer. Accordingly, upper 110 is formed from a variety of elements that form a structure for receiving and securing the foot.

Turning to FIG. 2, the primary elements of sole structure 120 are a fluid-filled chamber or chamber 130 and an outer sole 140. Chamber 130 may be, for example, a sealed fluid-filled chamber containing a pressurized fluid, which will be discussed below. Moreover, chamber 130 is (a) located within a portion of void 111 that is formed by outer sole 140 and (b) positioned to extend under and support a foot located within the other portion of void 111.

Outer sole 140 includes a body portion 141 and a ground-engagement portion 142. Body portion 141 has a generally concave configuration forming a depression in outer sole 140 that extends through regions 102-104 and sides 106, 108, thereby extending through a majority of a length and width of sole structure 120. The depression forms the portion of void 111 that receives chamber 130. As such, a surface of the depression has a shape corresponding to the general shape of chamber 130. Thus, upper 110 and outer sole 140 may cooperate to provide void 111 with a shape that accommodates both the foot of the wearer and chamber 130. Ground engagement portion 142 is secured to a lower surface of body portion 141 and is textured to enhance the traction (i.e., friction) properties between footwear 100 and the ground. Although not depicted, sole structure 120 may further include a sockliner that is positioned upon an upper surface of chamber 130. The sockliner may be a compressible member located within void 102 and adjacent a lower surface of the foot to enhance the comfort of footwear 100. In configurations where a sockliner is not utilized, the foot may rest directly upon an upper surface of chamber 130, or a textile (e.g., non-woven textile) may be secured to the upper surface of chamber 130.

Figure 3A:
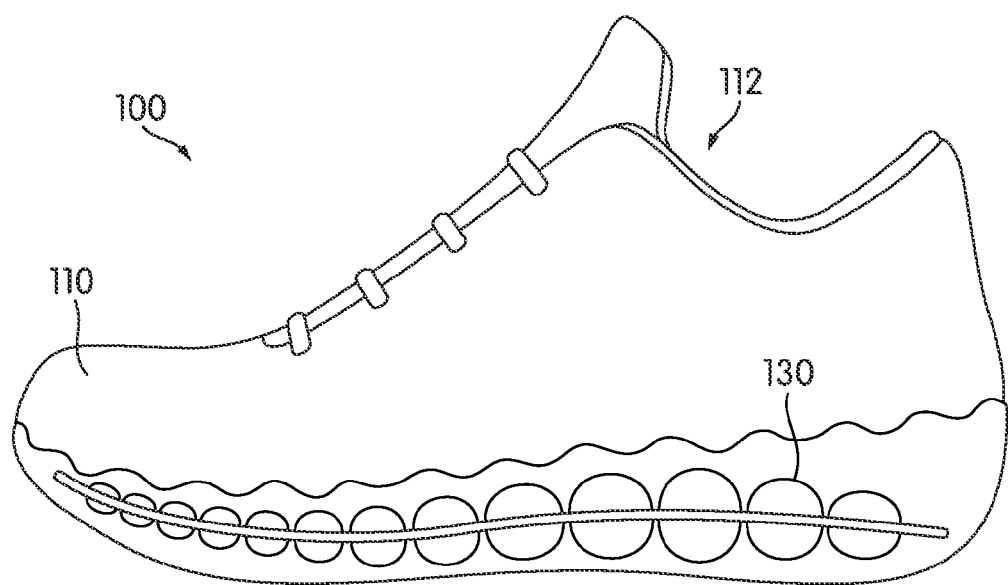
FIGS. 3A-3C are side elevational views of a process of removing a fluid-filled chamber from the article of footwear
Figure 3B:
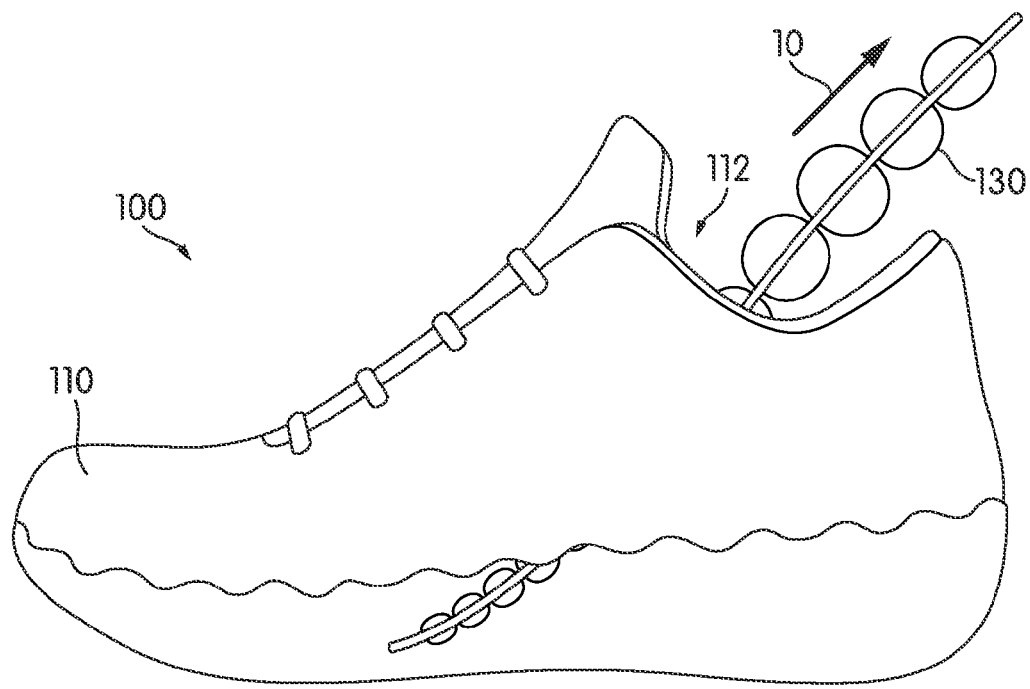
Figure 3C:
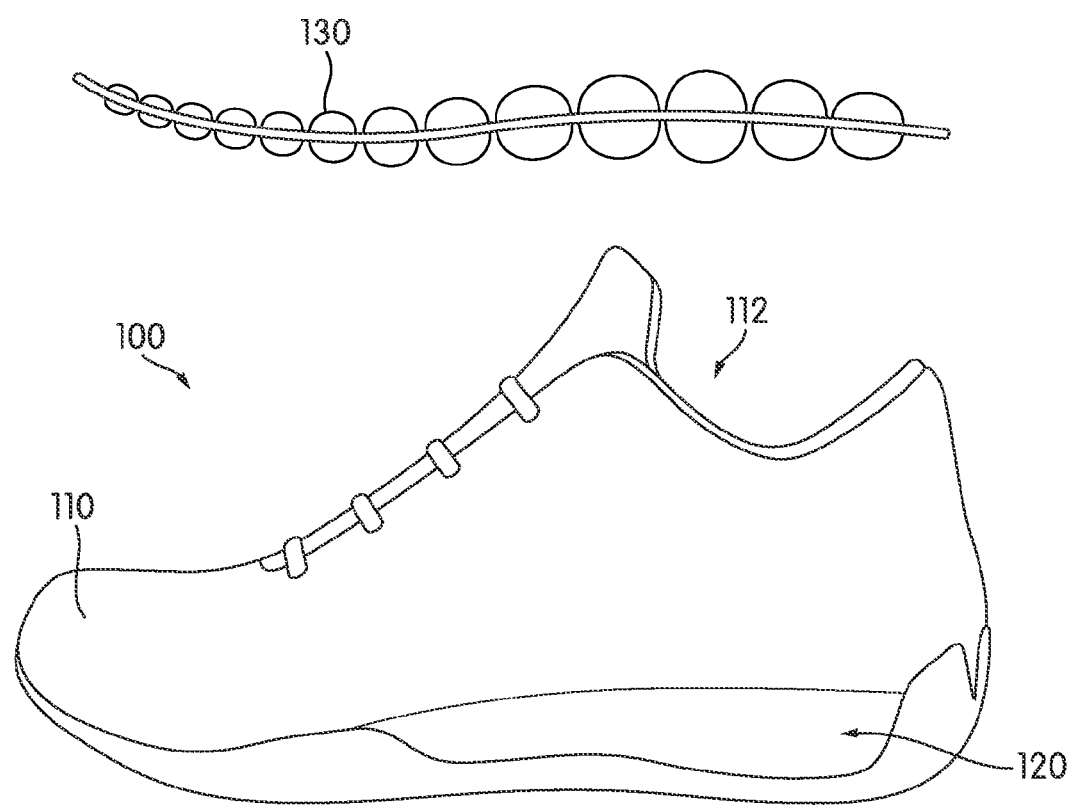

Turning to FIG. 3A, chamber 130 may extend within footwear 100 between forefoot region 102 and heel region 104 along a longitudinal axis $L_1$. Chamber 130 may be inserted within footwear 100 to provide cushioning and support to a foot inserted within footwear 100. As shown in the examples of FIGS. 3B and 3C, chamber 130 may be inserted or removed through ankle opening 112 in direction 10. Because chamber 130 may be inserted within and removed from footwear 100, chamber 130 may be replaceable. For example, chamber 130 may be removed from upper 110, such as by a user of footwear 100, and replaced by another chamber, when chamber 130 has become worn. In another example, chamber 130 may be modular and may be removed from upper 110, such by a user of footwear 100, and replaced by a chamber having different properties, such as a different amount of cushioning and support suitable for a desired activity.

According to another embodiment, chamber 130 may be secured to a lower area of upper 110 and may replace a strobel material that is conventionally utilized in footwear lasting processes. That is, a surface of chamber 130 or a polymer flange extending outward from edges of chamber 130 may be secured to the lower area of upper 110. In some configurations, an opposite surface of chamber 130 may be secured to outer sole 140. In such an example, a lower portion of upper 110 may be directly attached to chamber 130 instead of to body portion 141 of outer sole 140. Outer sole 140 may then be formed around chamber 130 to provide a ground contacting surface. Although a sockliner may extend between the foot and chamber 130, the foot may rest directly upon an upper surface of chamber 130, or a textile (e.g., non-woven textile) may be secured to the upper surface of chamber 130.

Figure 4:
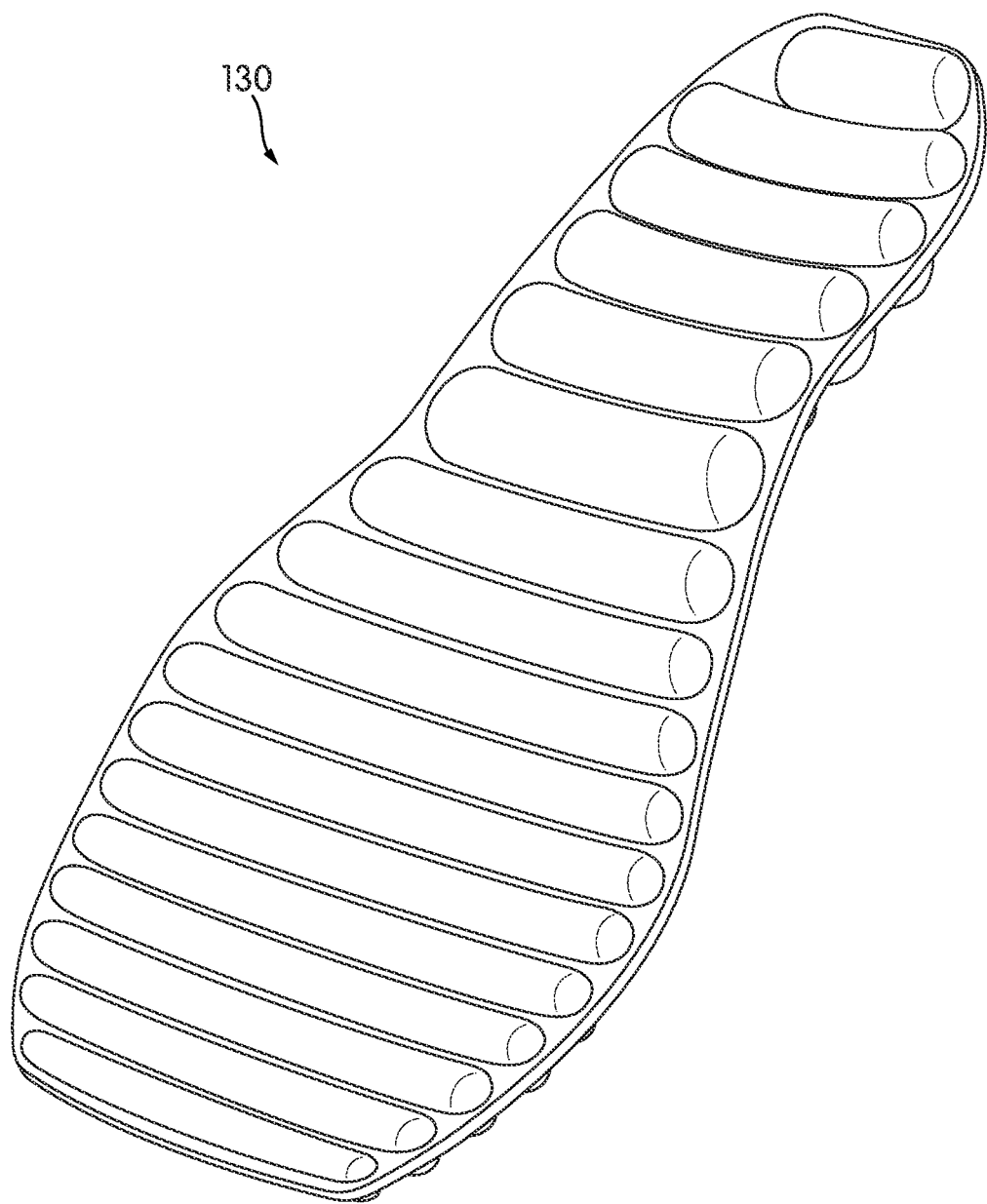
FIG. 4 is a perspective view of the chamber.
Figure 5:
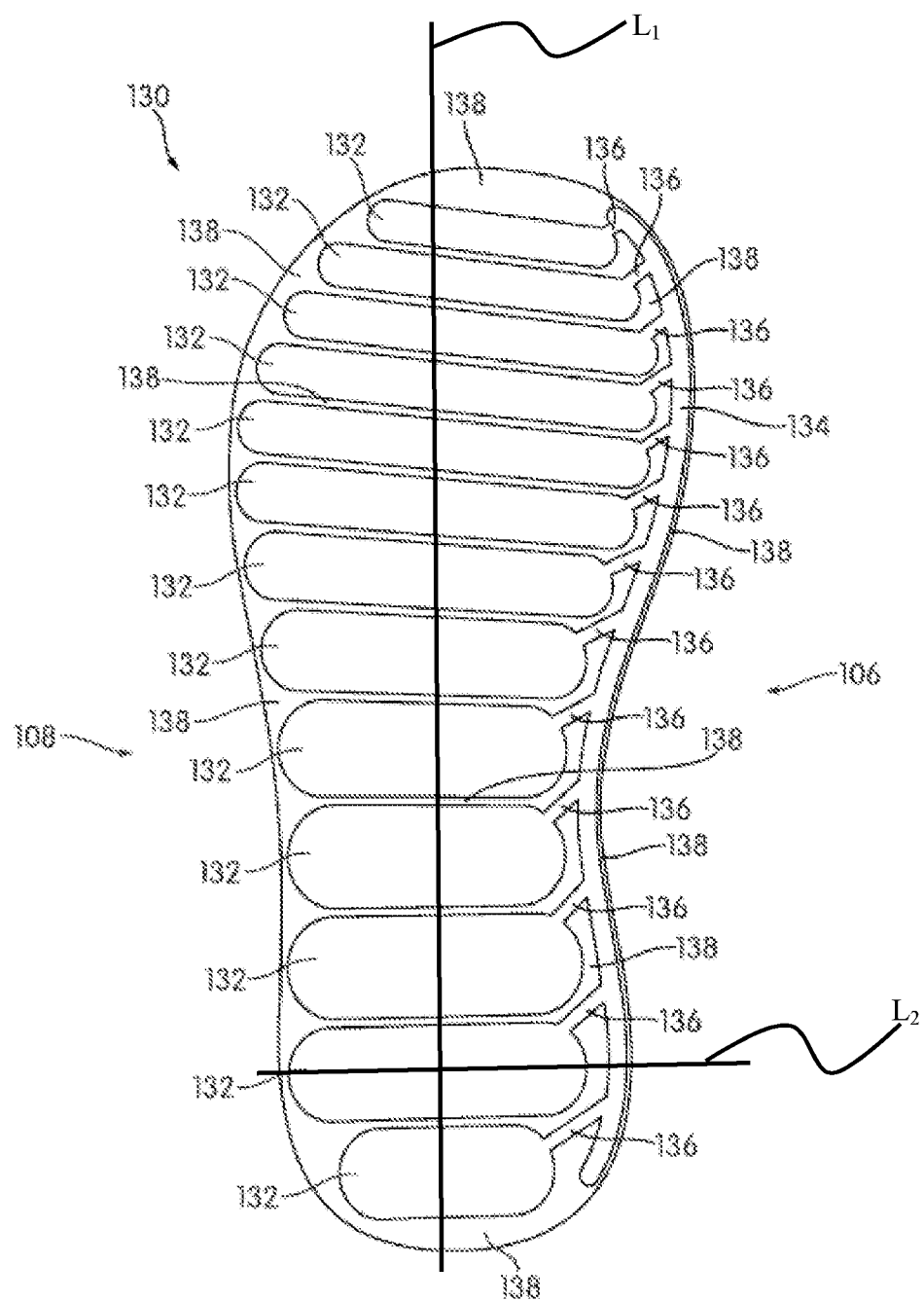
FIG. 5 is a top plan view of the chamber.
Figure 6:
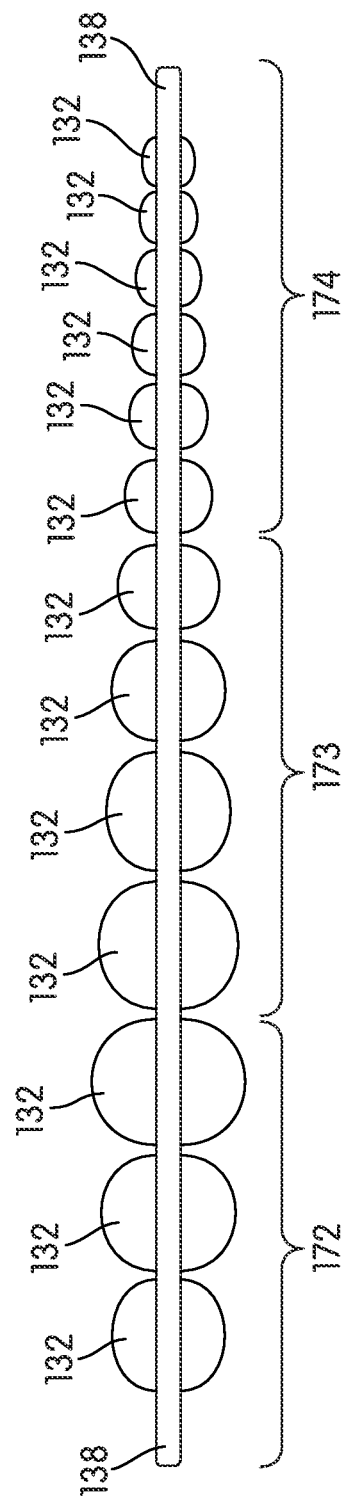
FIG. 6 is a side elevational view of the chamber.

FIGS. 4-6 show an exemplary configuration of chamber 130, which is sealed to contain a pressurized fluid. When incorporated into footwear 100, chamber 130 may have a shape that fits within a perimeter of sole structure 120 (i.e., within the depression in outer sole 140) and substantially extends from forefoot region 102 to heel region 104 and also from lateral side 108 to medial side 106, thereby corresponding with a general outline of the foot. When the foot is located within upper 110, chamber 130 extends under substantially all of the foot in order to attenuate ground reaction forces that are generated when sole structure 120 is compressed between the foot and the ground during various ambulatory activities, such as running and walking. In another configuration, midsole 122 may include additional materials or components, such as, for example, foam. Although chamber 130 is located within outer sole 140, portions of body portion 141 may form apertures or other openings that expose areas of chamber 130. As such, chamber 130 may form a portion of the sidewall of footwear 100 in some configurations. In other configurations, chamber 130 may extend under only a portion of the foot.

Chamber 130 may include one or more subchambers 132 that enclose the pressurized fluid, thereby providing cushioning and support to the foot. Subchambers 132 may be defined by a bonded area 138 that surrounds subchambers 132, as shown in the example of FIG. 5. Bonded area 138 may extend around chamber 130 to form a sealed perimeter of chamber 130. Bonded area 138 may also extend between subchambers 132, as shown in FIG. 5, to separate subchambers 132 from one another. More particularly, portions of bonded area 138 are oriented in a direction that extends between sides 106, 108 to separate portions of bonded area 138 and prevent the fluid from passing between adjacent subchambers 132. The portions of bonded area 138 located between subchambers 132 are aligned in a direction extending through each of regions 102-104, thereby being located between the heel and toe of chamber 130. A majority of chamber 130 may be provided by subchambers 132. For instance, subchambers 132 may provide approximately 80% or more of the volume of chamber 130. In another example, subchambers 132 may provide approximately 90% or more of the volume of chamber 130.

Bonded areas 138 located in between each subchamber 132 may provide a relatively thin portion of chamber 130 in comparison to a thickness of each subchamber 132, as shown in FIG. 6. As a result, the bonded area 138 in between each subchamber 132 may not only separate individual subchambers from one another but also provide areas of enhanced flexibility for chamber 130, permitting chamber 130 to bend and correspond to movements to a foot within footwear 100.

Subchambers 132 may have a uniform size or may vary in size. For example, as shown in FIG. 6, subchambers 132 in midfoot region 173 and in heel region 172 may have a larger cross-sectional shape or a larger diameter than subchambers 132 in forefoot region 174. In another example, subchambers 132 in heel region 172 may have a larger cross-sectional shape or diameter than subchambers 132 in midfoot region 173 and subchambers 132 in forefoot region 174, and subchambers 132 in forefoot region 174 may have a larger cross-sectional shape or diameter than subchambers 132 in midfoot region 173. In another example, subchambers 132 in midfoot region 173 may have a larger cross-sectional shape or diameter than subchambers 132 in heel region 172 and subchambers 132 in forefoot region 174.

Subchambers 132 can be in the form of tubes that extend in a direction between medial side 106 and lateral side 108 of chamber 130 along respective longitudinal axes $L_2$, as shown in FIG. 5. Subchambers 132 may have a shape other than the shape of a tube, such as, for example, a circular, rectangular, or other shape. In one configuration, subchambers 132 may have a substantially round cross-section, as shown in the example of FIG. 6. In other configurations, subchambers 132 may have various cross-sections, such as, for example, a circular, oval, rectangular, or other shape.

To provide pressurized fluid to each of the individual subchambers 132 and inflate subchambers 132, chamber 130 may include a manifold 134 that distributes the pressurized fluid to subchambers 132. Manifold 134 may be connected to a conduit external to chamber 130 (not shown) that supplies the pressurized fluid to the manifold during an inflation process, as will be discussed below. Manifold 134 may be on medial side 106 of chamber 130, as shown in the example of FIG. 5, or may be located on lateral side 108 of chamber 130.

As shown in FIG. 5, each respective individual fluid connection 136, in a direction from a toe end of the chamber 130 toward a heel end of the chamber 130, is successively farther in distance from the toe end of the chamber. A cross-sectional area of each individual fluid connection 136 is less than a cross-sectional area of the individual fluid connection's respective subchamber 132.

To distribute the pressurized fluid to subchambers, manifold 134 may be fluidically-connected to the subchambers by connections. As shown in the example of FIG. 5, manifold 134 may be connected to individual subchambers 132 by connections 136. In another configuration, a connection may connect more than one subchamber to manifold. For instance, two, three, or four or more subchambers 132 may be connected to manifold 134 with a single connection 136.

According to an embodiment, chamber 130 may include a layer or coating on its outer surface. Such a layer or coating may be used, for example, to alter the surface texture or roughness of chamber 130 so that chamber is less smooth. For instance, a layer or coating may be applied to chamber 130 to make chamber 130 feel more like a fabric. Such a layer or coating may be, for example, a textile having a configuration of a knitted, woven, or non-woven material. In a further example, a layer or coating may be a non-woven thermoplastic polyurethane (TPU). By providing chamber 130 with a layer or coating, a sockliner that may otherwise be placed on top of chamber 130 within an article of footwear may be unnecessary. Thus, a chamber 130 with a layer or coating applied or bonded to its surface may be placed within an article of footwear without a sockliner so that a foot inserted within the article of footwear directly contacts chamber 130. Although various methods may be utilized to bond a textile to chamber 130, the textile may be placed within a mold (see discussion below) that forms chamber 130 and bonded to chamber 130 during a molding process.

Figure 7:
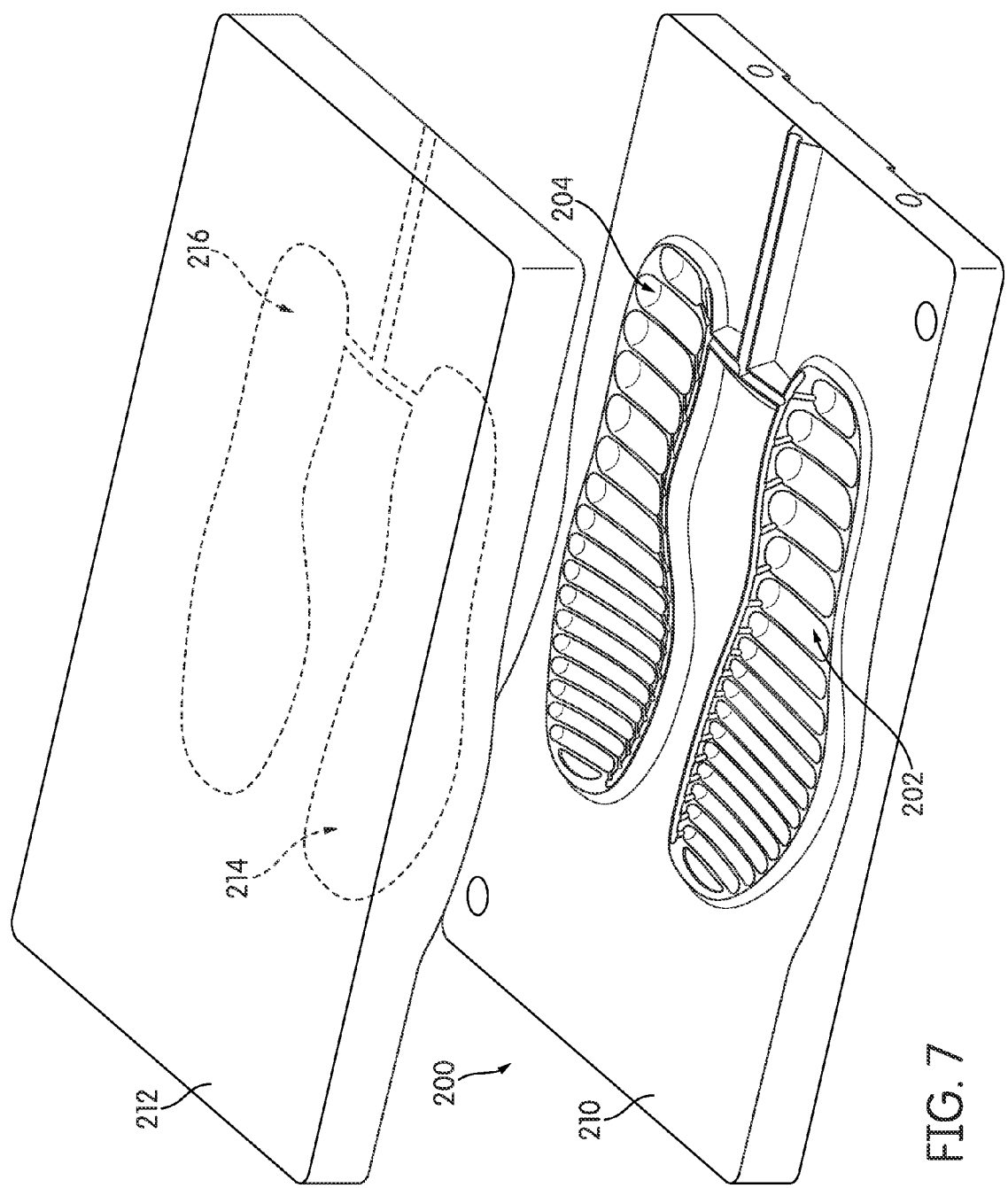
FIG. 7 is a perspective view of a mold for manufacturing a fluid-filled chamber.
Figure 8:
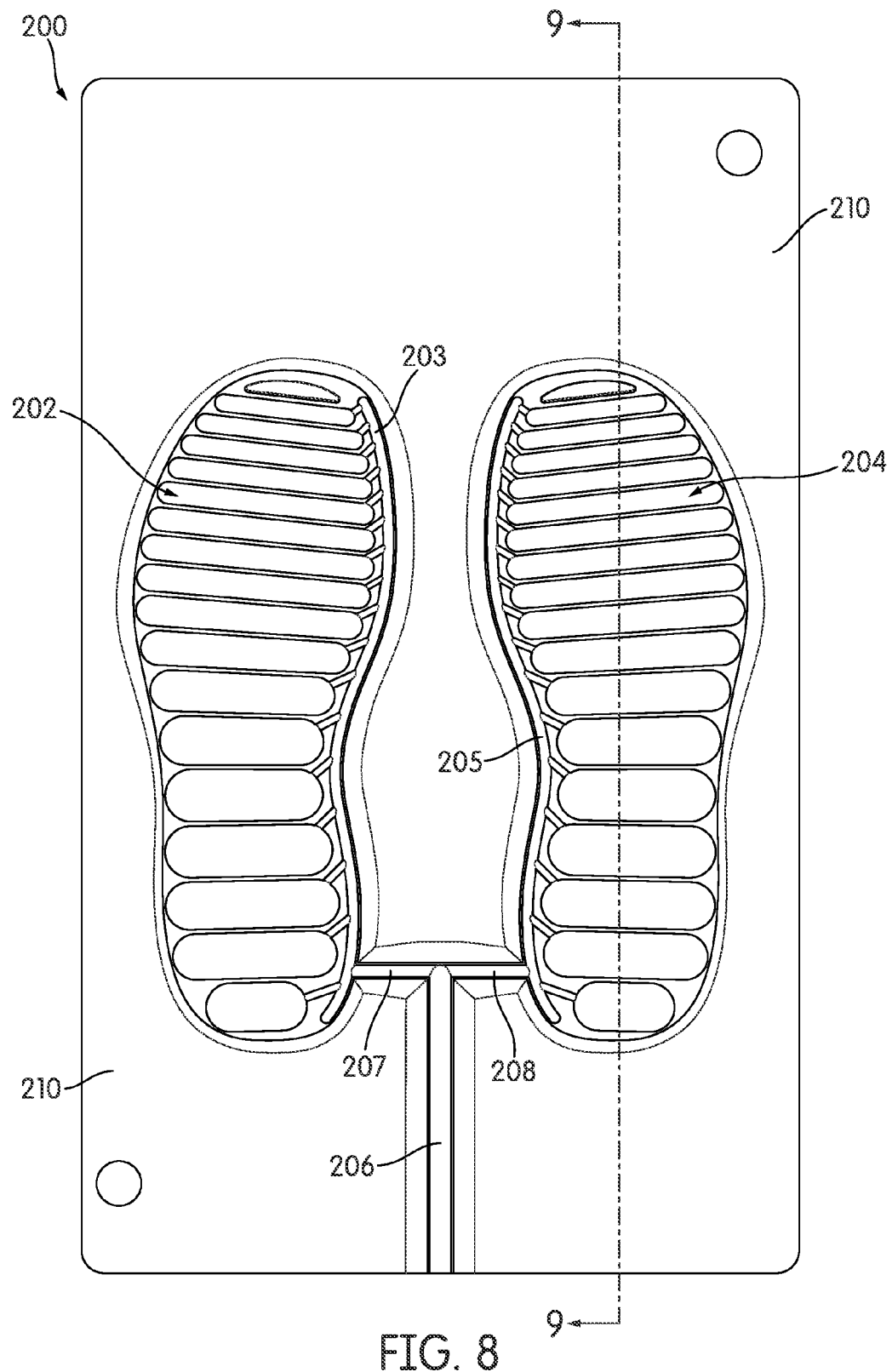
FIG. 8 is a top plan view of a portion of the mold.
Figure 9:
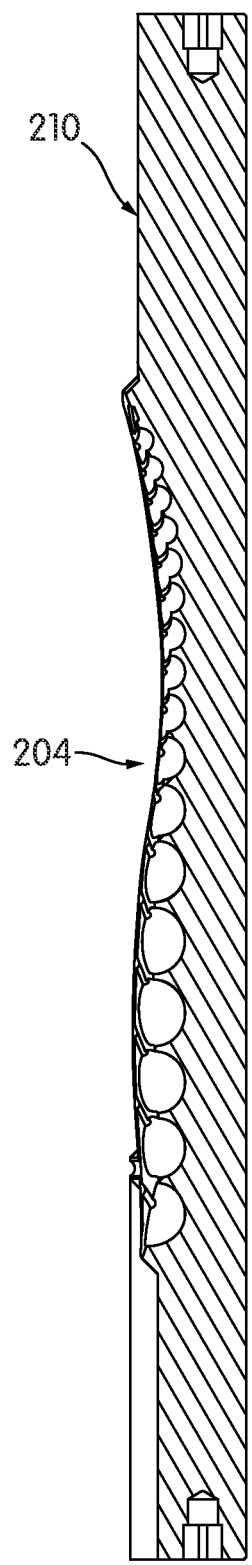
FIG. 9 is a cross-sectional view of the portion of the mold along line 9-9 of FIG. 8.

Turning to FIG. 7, a configuration of a mold 200 for molding a pair of chambers is shown. Mold 200 may include a first mold section 210 and a second mold section 212 to mold chambers as described herein. First mold section 210 may include a first region 202 and a second region 204. First region 202 and second region 204 may have shapes corresponding to a desired shape and features of chamber 130, including subchambers 132, manifold 134, connections 136, and bonded areas 138. Second mold section may include a first region 214 that corresponds to first region 202 of first mold section 210 and a second region 216 that corresponds to second region 204 of first mold section 210 for molding a first chamber and a second region 204 for molding a second chamber. As shown in FIGS. 7 and 8, first region 202 and second region 204 of first mold section 210 may include recesses that correspond to subchambers 132 of chamber 130, although any number of recesses may be provided to correspond to a desired number of subchambers in a chamber. First region 202 and second region 204 also include recesses which correspond to connections 136 of chamber 130 and recesses 203, 205, respectively, which each correspond to manifold 134 of chamber 130. FIG. 9 depicts a cross-sectional view of mold half 200 along line 9-9 of FIG. 8 and shows another view of the recesses of second portion 204.

Portions of first mold section 210 and second mold section 212 that do not include a recess may serve to form bonded area 170 of chamber 130, such as between subchambers 132 of chamber 130 and a bonded area surrounding an outer perimeter of chamber 130. For example, portions of mold 200 located outside of first region 202 and second region 204 of first mold half 210 and located outside of first region 214 and second region 216 of second mold section 212 may be configured to form bonded area 170 of chamber 130.

Mold 200 may further include areas that form a conduit so that pressurized fluid may be supplied to chambers after being molded. As shown in the example of FIG. 8, a main indentation 206 may be provided in first mold section 210 to form a main conduit 506 in a molded product 500, which will be discussed below in regard to FIG. 12. During a subsequent inflation process after molding is complete, main conduit 506 receives a pressurized fluid to inflate molded product 500 and form a chamber. Main indentation 206 branches into a secondary indentation 207 to form a secondary conduit 507 in molded product 500. Main indentation 206 also branches into a secondary indentation 208 to form a secondary conduit 508 in molded product 500. Second mold section 212 may have indentations corresponding to those of first mold section 210 so that first mold section and second mold section 212 cooperate to mold the main and secondary conduits of molded product 500. Secondary indentation 207 fluidically-connects with recess 203 and secondary indentation 208 fluidically-connects with recess 205.

Figure 10A:
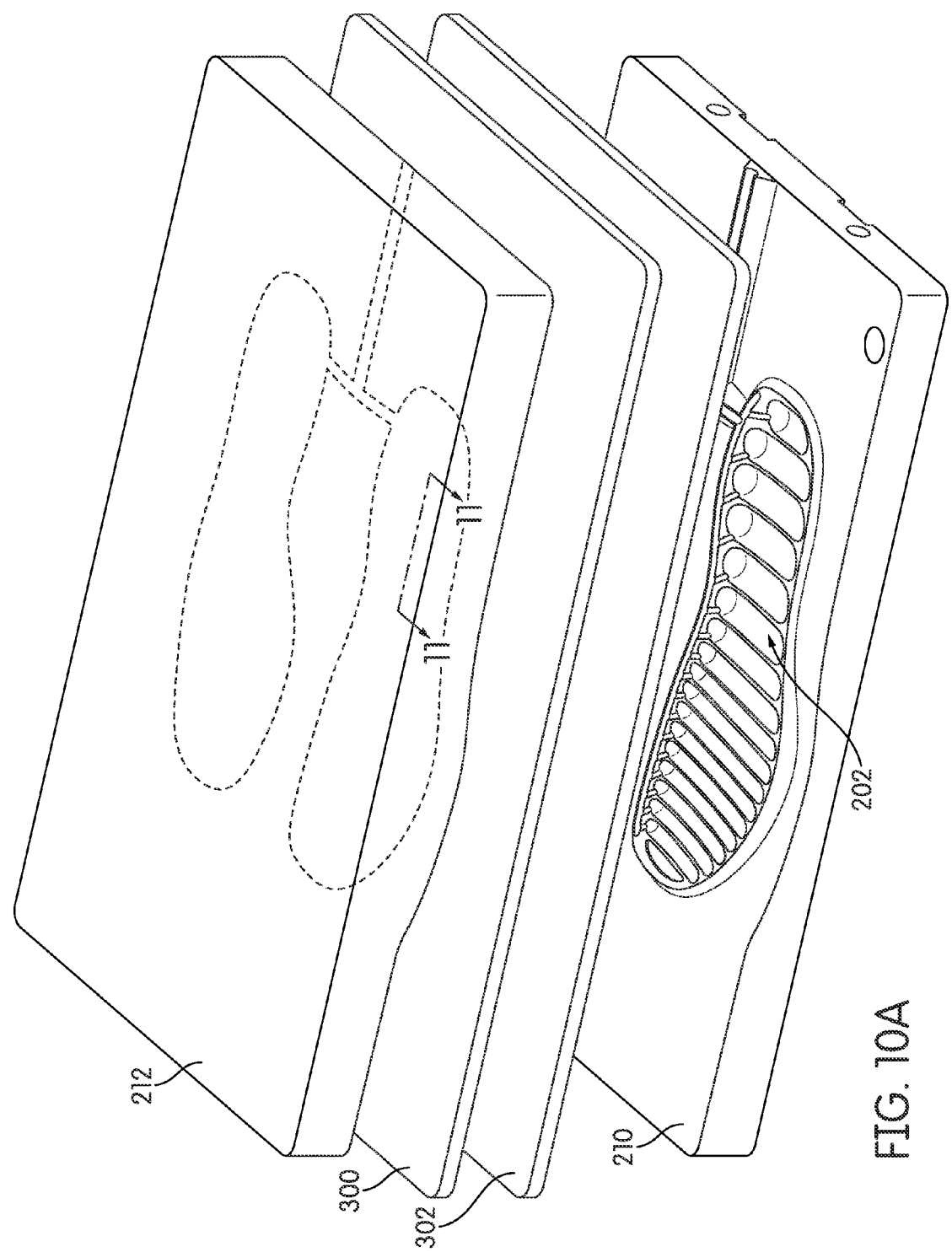
FIGS. 10A-10C are perspective views of a chamber manufacturing process utilizing the mold.

Turning to FIGS. 10A-11D, an exemplary process is explained for producing a chamber according to the configurations discussed herein. A process for manufacturing a chamber may be, for example, twin sheet thermoforming or another process used in the art, such as a flat-film bonding technique or blowmolding. As shown in FIG. 10A, first mold section 210 and second mold section 212 may be provided. A first sheet 300 and a second sheet 302 may be placed between first mold section 210 and second mold section 212, as shown in FIG. 10A. First sheet 300 and second sheet 302 may be provided as lower and upper barrier layers for a chamber and may be made from the materials described below for barrier layers.

Figure 10B:
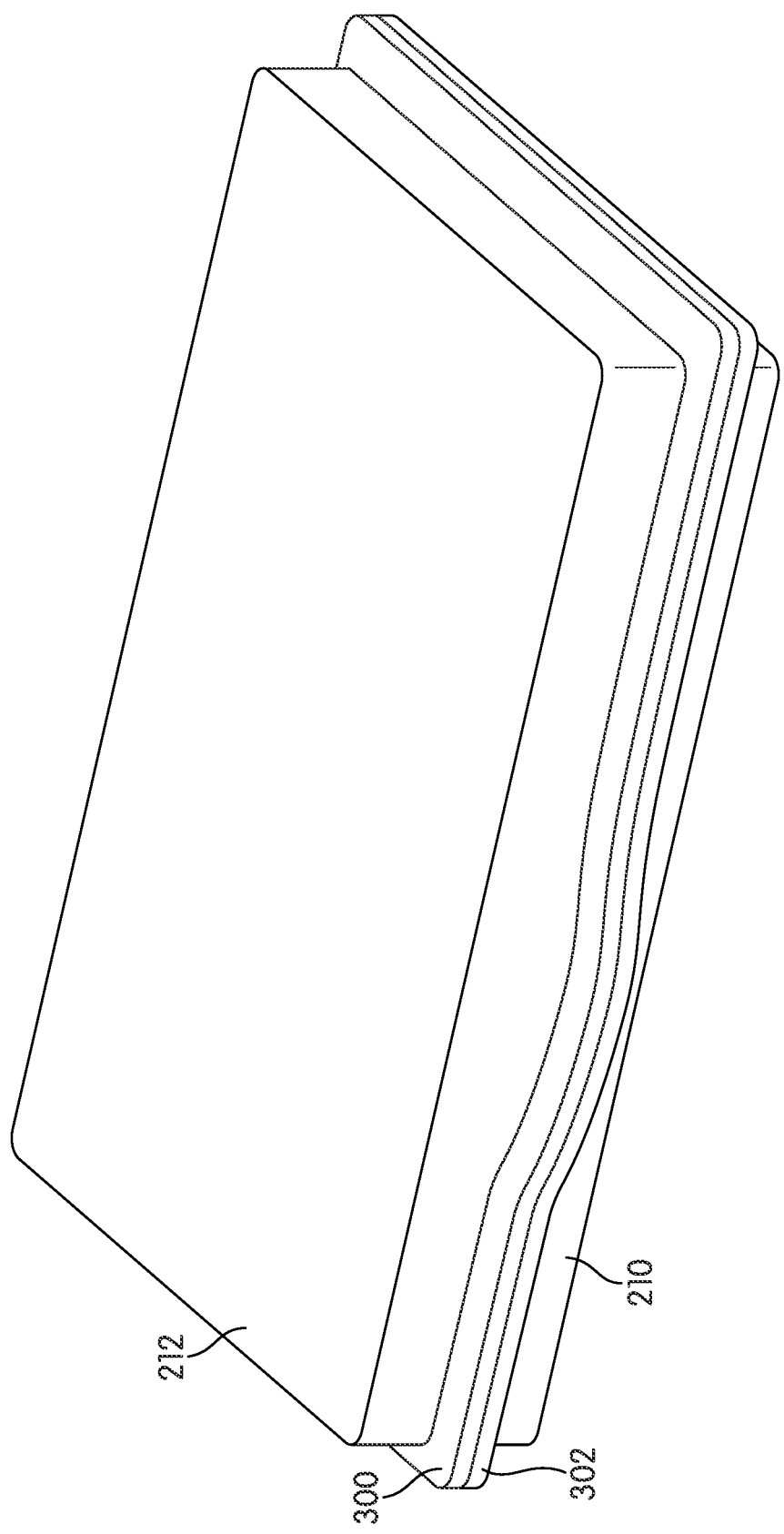
Figure 10C:
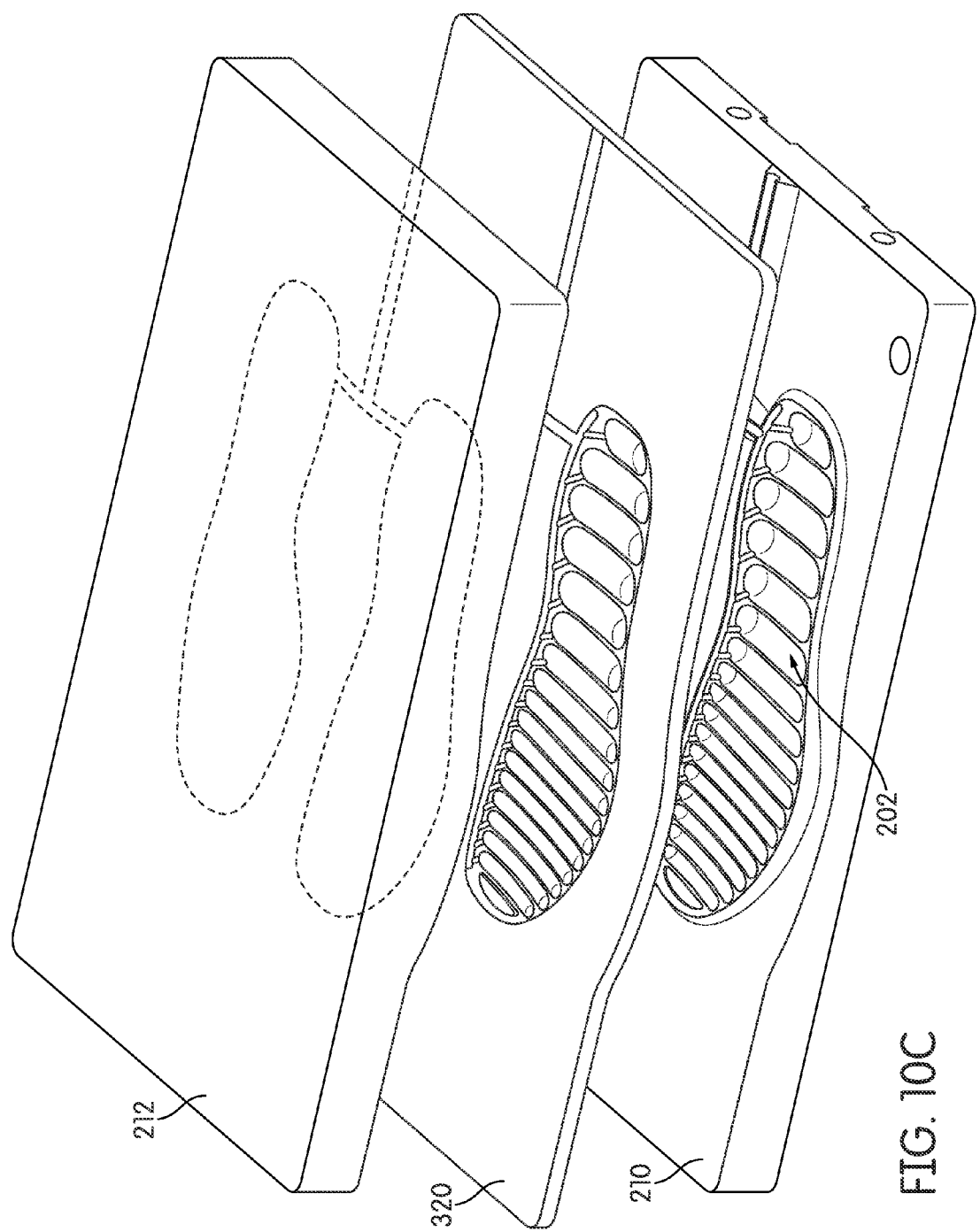

As shown in FIG. 10B, first mold section 210 and second mold section 212 may be closed together to bond first sheet 300 and second sheet 302. For example, when chamber 130 is being formed, first mold section 210 and second mold section 212 may cooperate to bond first sheet 300 and second sheet 302 together to form bonded area 170 of chamber 130. Further, at least one of first mold section 210 and second mold section 212 may include main indentation 206 and secondary indentations 207, 208 to supply pressurized fluid and inflate subchambers 132 within recesses (not shown but discussed below) of first mold section 210 and second mold section 212, as well as connections 136 and manifold 150. Once bonding is complete, first mold section 210 and second mold section 212 may be separated to release a molded product 500 formed from first sheet 300 and second sheet 310, as shown in FIG. 10C. Molded product 500 is subsequently supplied with pressurized fluid to be inflated and form a chamber.

Figure 11A:
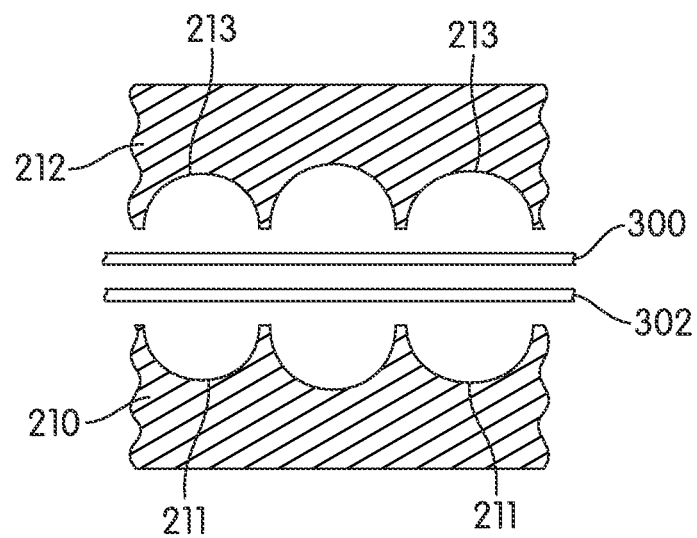
FIGS. 11A-11D are cross-sectional views of the chamber manufacturing process along line 11-11 in FIG. 10A.
Figure 11B:
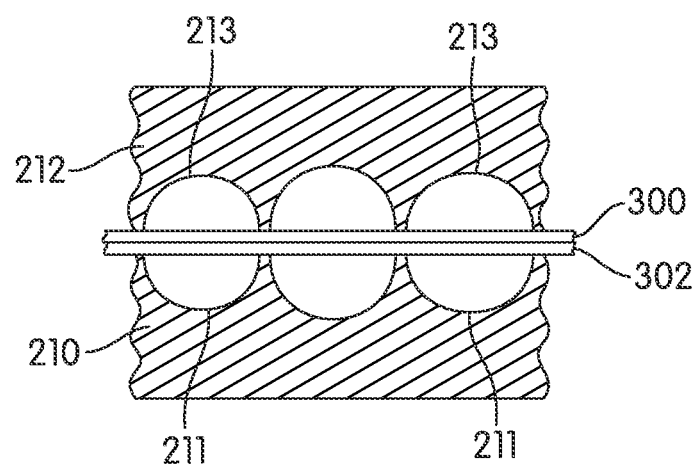

During the bonding process, first sheet 300 and second sheet 302 are formed to have the general shape of mold sections 210, 212 and bonded together. Turning to FIG. 11A, which is a side cross-sectional view taken along line 11-11 of FIG. 10A, first mold section 210 may include recesses 211 and second mold section 212 may include recesses 213. Recesses 211, 213 may cooperate to provide a shape corresponding to subchambers 132 of chamber 130. Subsequently, first mold section 210 and second mold section 212 may be closed together, with first sheet 300 and second sheet 302 in between. Further, if a chamber formed from first sheet 300 and second sheet 302 is to include a layer or coating on its surface, as discussed above, one or more sheets of material (not shown) may be placed between first sheet 300 and mold section 212 and/or between second sheet 302 and mold section 210 to apply the material as a layer or coating during the bonding process.

Figure 11C:
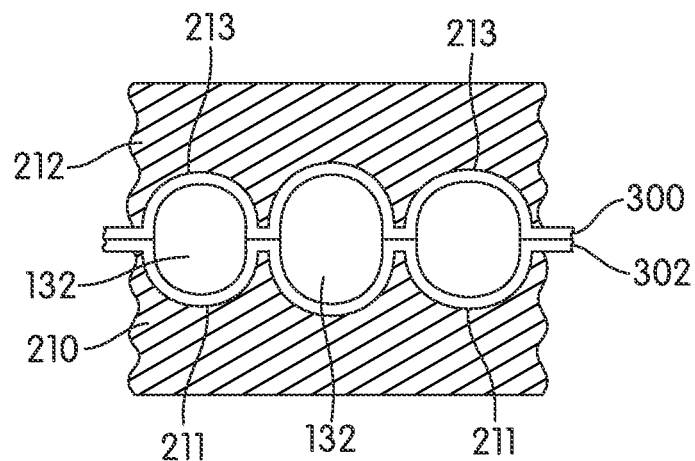
Figure 11D:
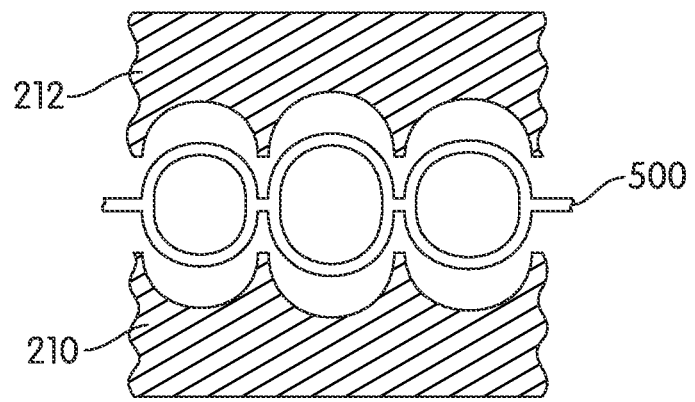

Next, first sheet 300 and second sheet 302 are deformed to the surface of mold sections 210, 212. Mold sections 210, 212 may be heated so that sheets 300, 302 are in turn heated and softened to assist with the deformation of sheets 300, 302. A fluid may be supplied between first sheet 300 and second sheet 302. In particular, the fluid may be supplied to unbounded areas of first sheet 300 and second sheet 302 located within recesses 211, 213. The fluid may be used to force first sheet 300 and second sheet 302 towards surfaces of mold sections 210, 212 so that the fluid assists with the deformation of sheets 300, 302 to the shape of mold sections 210, 212. For example, fluid may be supplied via main indentation 206 and secondary indentations 207, 208 formed in either or both of first mold section 210 and second mold section 212, as shown in FIG. 8. In addition, air may be withdrawn from between sheets 300, 302 and mold sections 210, 212 to assist with deforming sheets 300, 302 to the general shape of mold sections 210, 212, particularly the shape of recesses 211, 213. Because the portions of first sheet 300 and second sheet 302 located within recesses 211, 213 are not bonded to one another, fluid supplied to recesses 211, 213 cause these portions of first sheet 300 and second sheet 302 to separate and generally adapt the shape of recesses 211, 213, as shown in FIG. 11C. These unbonded portions of first sheet 300 and second sheet 302 within recesses 211, 213 may be formed as subchambers 132 of chamber 130 during a subsequent inflation operation (not shown) after bonding is complete. Finally, when the molding process is complete, first mold section 210 and second mold section 212 may be separated to release a molded product 500, as shown in FIG. 11D.

During the subsequent inflation of subchambers 132, the pressure of the fluid within subchambers 132 may be selectively controlled. In one configuration, a pressure of the pressurized fluid contained within subchambers 132 may be substantially uniform, with the pressurized fluid within each of subchambers 132 being at substantially the same pressure. For example, the pressure within chamber 130 (and within each of the individual subchambers 132) may be from approximately 0-14 psi (approximately 0-97 kPa). In another example, the pressure with each of the individual subchambers 132 may be from approximately 2-14 psi (approximately 13-97 kPa).

In another configuration, the pressures of the fluid within subchambers 132 may be advantageously selected and varied to provide a desired amount of cushioning and support for different portions of a foot. For example, the pressure of subchambers in heel region 172 may be selected to be greater than the pressure of subchambers in forefoot region 174 to provide greater cushioning and support to a heel portion of a foot. For instance, subchambers 132 in heel region 172 may have a pressure of approximately 7-10 psi (approximately 48-69 kPa), while subchambers 132 in forefoot region 174 may have a pressure of approximately 3-5 psi (approximately 20-34 kPa). The pressurized fluid within the subchambers of heel region 172 may also be at a higher pressure than the subchambers of midfoot region 173. For example, the pressure of subchambers in heel region 172 may be selected to be greater than the pressure of subchambers in both the forefoot region 174 and the midfoot region 173. In another example, the pressure of subchambers in heel region 172 may be selected to be greater than the pressure of subchambers in both the forefoot region 174 and the midfoot region 173, and the pressure of subchambers in the forefoot region 174 may be greater than the pressure of subchambers in the midfoot region 173 to provide greater cushioning and support to the heel and forefoot portions of a foot. For instance, subchambers 132 in heel region 172 may have a pressure of approximately 9-12 psi (approximately 62-83 kPa), subchambers 132 in midfoot region 173 may have a pressure of approximately 2-4 psi (approximately 14-28 kPa), and subchambers 132 in forefoot region 174 may have a pressure of approximately 5-7 psi (approximately 34-48 kPa).

In another configuration, the pressure of the pressurized fluid may vary from subchamber to subchamber. For example, the pressure in subchambers 132 may decrease from the heel to the forefoot of the chamber 130. In another example, subchambers 132 in heel region 172 may each have a different pressure that is higher than the pressures of subchambers 132 in midfoot region 173, and subchambers 132 in forefoot region 174 may each have a different pressure that is higher than the pressures of subchambers 132, which also vary.

Variations in pressure from region to region or subchamber to subchamber may be accomplished by selective sealing of the connections between the subchambers and the manifold. For example, pressurized fluid may be supplied to manifold 134 at a first pressure and the pressurized fluid may be then be supplied to subchambers 132 via connections 136. As a result, subchambers 132 are supplied with the pressurized fluid at the first pressure. If it is desired that one or more regions or subchambers be pressurized to a greater pressure than another region or subchamber, selected connections between the subchambers and the manifold may be carried out.

For example, a process can be utilized for providing subchambers 132 in midfoot region 173 with pressurized fluid at a pressure of approximately 2-4 psi (approximately 14-28 kPa), subchambers 132 in forefoot region 174 with a pressurized fluid at a pressure of approximately 5-7 psi (approximately 34-48 kPa), and subchambers 132 in heel region 172 with pressurized fluid at approximately 9-12 psi (approximately 62-83 kPa). First, the pressurized fluid at a pressure of approximately 2-4 psi (approximately 14-28 kPa) may be first supplied to all of subchambers 132 via manifold 134 and connections 136. Second, connections 136 that connect subchambers 132 of midfoot region 173 to manifold 134 may be sealed to enclose the pressurized fluid at approximately 2-4 psi within subchambers 132 in midfoot region 173. Third, the supplied pressurized fluid may be increased in pressure to approximately 5-7 psi (approximately 34-48 kPa) so that subchambers 132 in forefoot region 174 and subchambers 132 in heel region 172 include pressurized fluid at approximately 5-7 psi (approximately 34-48 kPa). Fourth, connections 136 that connect subchambers 132 to manifold 134 may be sealed to enclose the pressurized fluid at approximately 5-7 psi within subchambers 132 in forefoot region 174. Fifth, the supplied pressurized fluid may be increased in pressure to approximately 9-12 psi (approximately 62-83 kPa) so that subchambers 132 in heel region 172 include pressurized fluid at approximately 9-12 psi (approximately 62-83 kPa). Next, connections 136 that connect subchambers 132 to manifold 134 may be sealed to enclose pressurized fluid at approximately 9-12 psi (approximately 62-83 kPa) within subchambers 132 in heel region 172.

In another example, instead of sealing individual connections to subchambers 132, manifold 134 itself may be sealed. For instance, if pressurized fluid is supplied to manifold 134 from an end of manifold 134 in heel region 104 and the pressurized fluid flows along manifold 134 from heel region 104 to midfoot region 103 and then to forefoot region 102, manifold 134 may be sealed between midfoot region 103 and forefoot region 102 after a desired pressure of the pressurized fluid has been supplied to forefoot region 102. Subsequently, after a desired pressure of the pressurized fluid has been supplied to midfoot region 103, manifold may be sealed between heel region 104 and midfoot region 103. Finally, once a desired pressure has been supplied to subchambers 132 of heel region 104, manifold 134 may be sealed.

The exemplary processes described above may be modified to provide regions 172-174 with different pressures or to provide individual subchambers 132 with specific, desired pressures. For example, if specific pressures are desired for each of subchambers 132, any of connections 136 may be individually sealed after supplying a desired pressure to manifold 134, thus providing a particular pressure to each of subchambers 132.

Other processes may be used to manufacture chamber 130. For example, chamber 130 may be formed via a flat-film bonding process, in which first sheet 300 and second sheet 302 are bonded together along their respective peripheries to form a sealed structure, and sheets 300 and 302 are also bonded together at predetermined interior areas to give chamber 130 and each of subchambers 132 a desired configuration. That is, the interior bonds provide chamber 130 with a predetermined shape and size when inflated. Blowmolding may also be utilized to form chamber 130, wherein a molten or otherwise softened elastomeric material in the shape of a tube is placed in a mold having the desired overall shape and configuration of chamber 130. Pressurized air induces the liquefied elastomeric material to conform to the shape of the inner surfaces of the mold. The elastomeric material then cools, thereby forming chamber 130 to have the desired shape and configuration.

Figure 12:
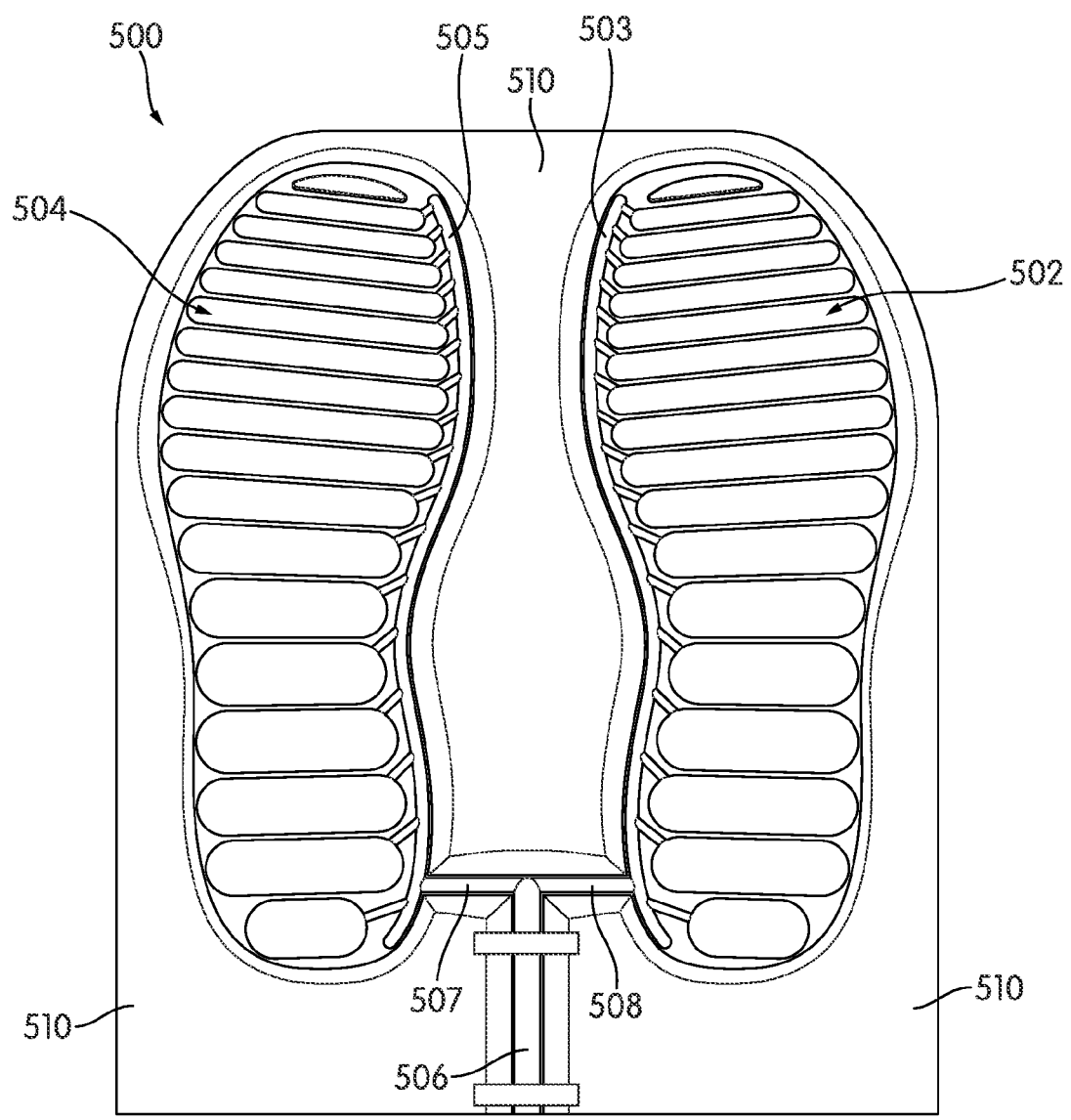
FIG. 12 is a top plan view of a product from the mold.

A configuration of a product 500 of a molding process is depicted in FIG. 12. Product 500 may be in the general form of a sheet that includes a first chamber 502 and a second chamber 504 that have each been inflated and sealed to contain a pressurized fluid. First chamber 502 and second chamber 504 may be contained within a bonded area 510 that surrounds first chamber 502 and second chamber 504. Such a bonded area 510 may be provided, for example, by bonding first sheet 400 and second sheet 402 in the process described above. Each of first chamber 502 and second chamber 504 may include any number of subchambers and connections, as described for chamber 130, for example. Product 500 may include a main conduit 506 through which the pressurized fluid was supplied, as well as a secondary conduit 507 and a secondary conduit 508 that are respectively fluidically-connected to manifold 503 of first chamber 502 and manifold 505 of second chamber 504.

Once molding of product 500 has been completed, a seal may be provided within main conduit 506, and/or secondary conduits 507, 508, and/or at an opening to manifolds 503, 505 to seal the pressurized fluid within chamber 502 and chamber 504. After sealing has been completed, first chamber 502 and second chamber 504 may be removed from the general sheet form of product 500, such as by cutting off the bonded area 510 surrounding first chamber 502 and second chamber 504.

Further Configurations

Figure 13:
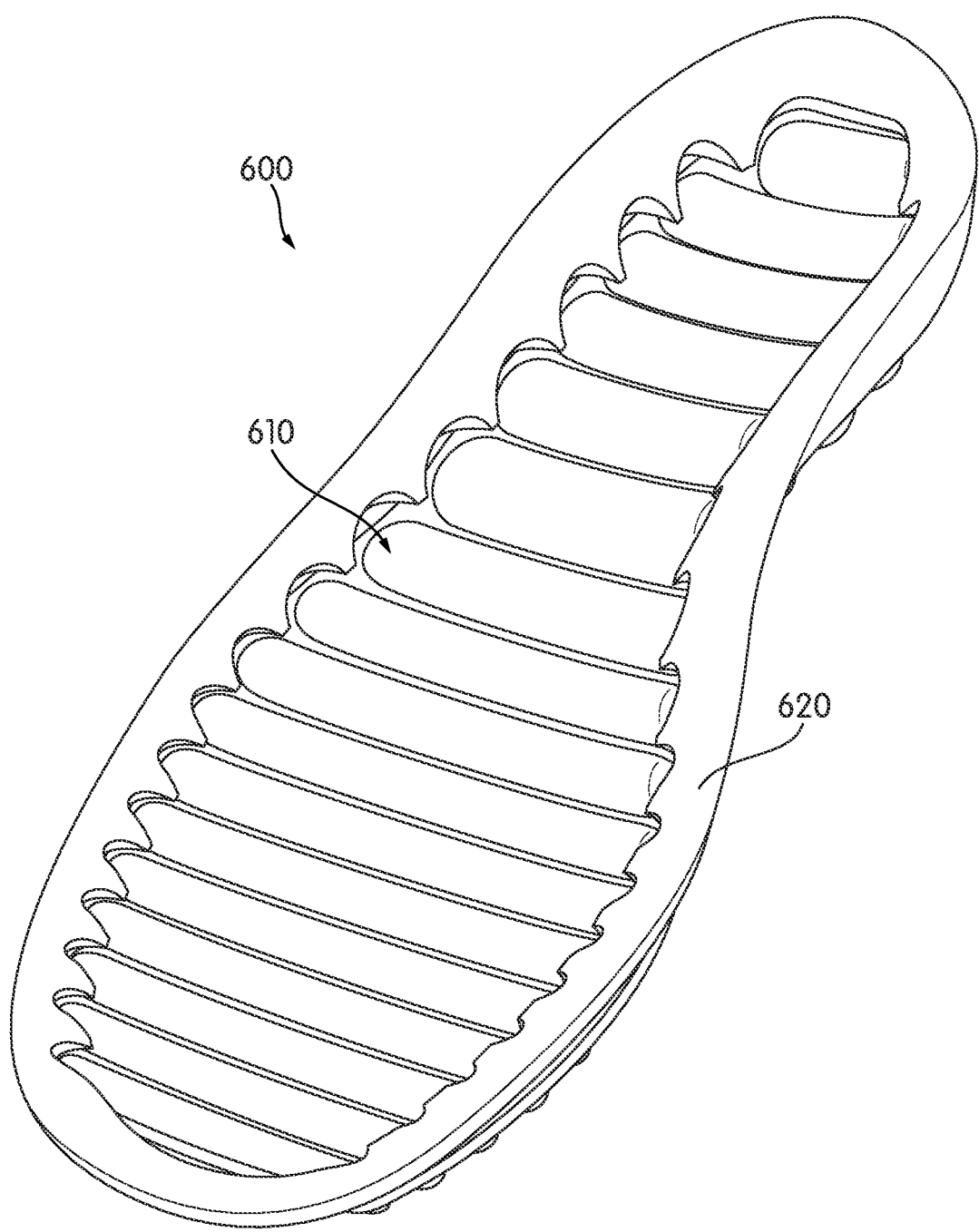
FIG. 13 is a perspective view of a fluid-filled chamber with an insert.

According to one configuration, a chamber may include additional components. For example, a chamber may include one or more components to affect the fit of the chamber to a foot and/or the support provided by the chamber. Turning to FIG. 13, a foot-supporting system 600 may include a fluid-filled chamber 610, which may have the features of any of the chamber configurations described herein, and an insert 620. Insert 620 may also provide lateral support and stability to the foot inserted within footwear 100 by providing support on each side of the foot. Insert 620 may be made of foam, fabric, or any combination of materials. Insert 620 may be joined to fluid-filled chamber 610 or may be separate from fluid-filled chamber 610.

Figure 15:
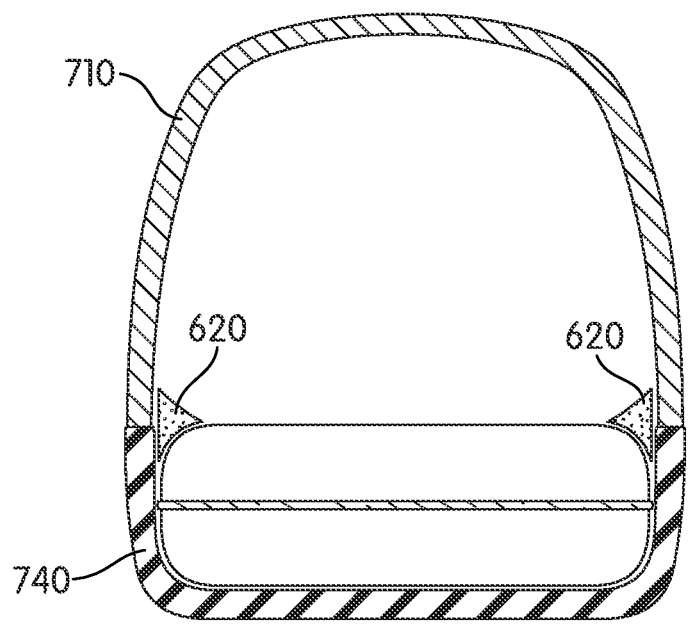
FIG. 15 is a cross-sectional view of an article of footwear including the fluid-filled chamber and the insert from FIG. 13.

As shown in the example of FIG. 13, insert 620 may be located on a top surface of fluid-filled chamber 610. FIG. 15 shows an example of fluid-filled chamber 610 inserted within an upper 710 and on top of an outsole 740, with insert 620 located on a top surface of fluid-filled chamber 610. According to another configuration, insert 620 may be located on a bottom surface of fluid-filled chamber 610, such as between fluid-filled chamber 610 and outsole 740.

Figure 14:
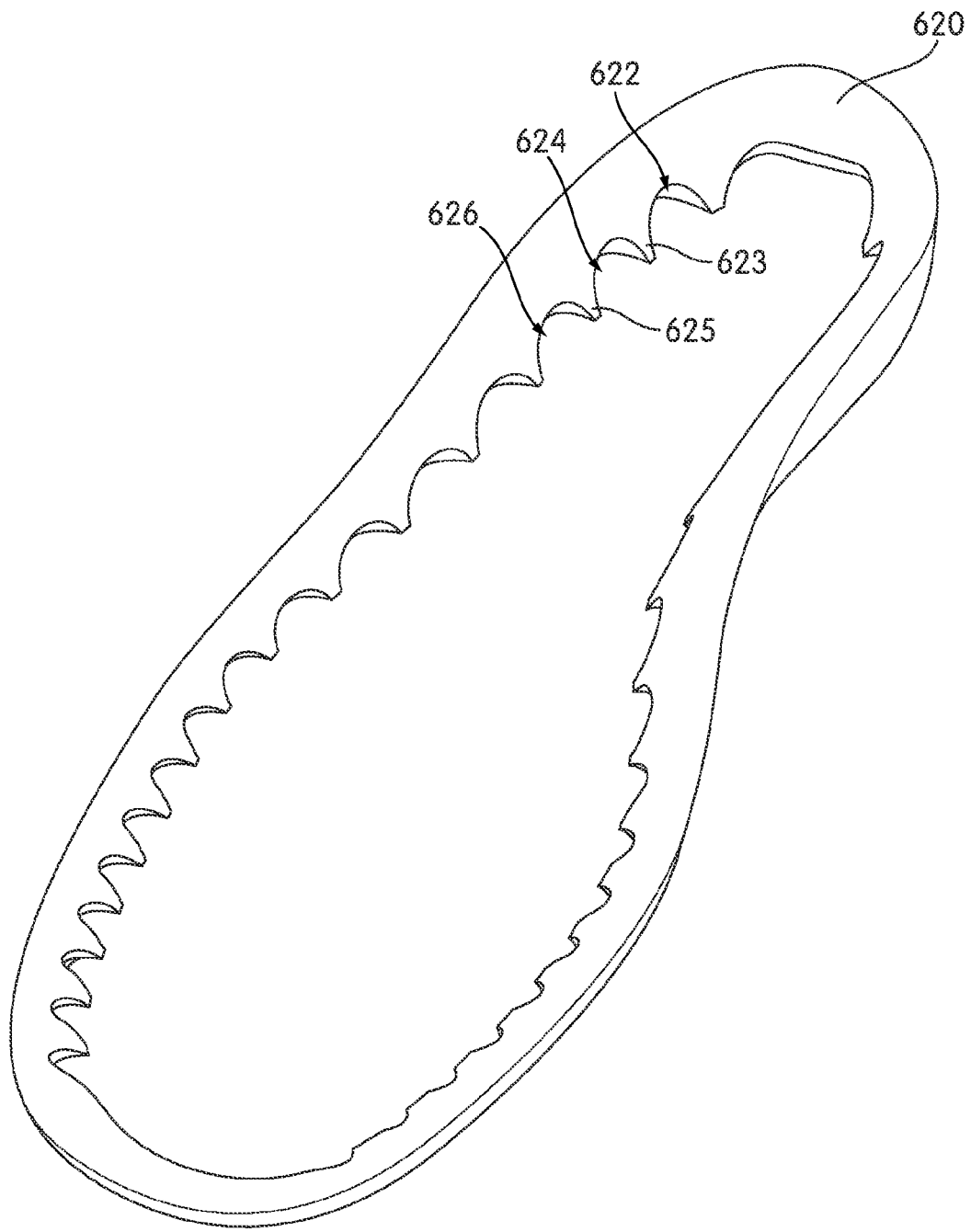
FIG. 14 is a perspective view of the insert.

Insert 620 may include structures to assist with fitting or joining insert 620 to fluid-filled chamber 610. Insert 620 may include one or more indentations 622, 624, 626 that project downwards towards a fluid-filled chamber, as shown in FIGS. 13 and 14. Indentations 622, 624, 626 may have locations and shapes corresponding to subchambers of a fluid-filled chamber. For example, indentations 622, 624, 626 may have locations and shapes corresponding to subchambers 132 of chamber 130 in FIG. 5. In addition, insert may include projections 623, 625 between indentations 622, 624, 626 to assist with fitting or joining insert 620 to fluid-filled chamber 610. Projections 623, 625 may be positioned to match the locations of bonded areas between subchambers of a fluid-filled chamber. For example, projections 623, 625 may correspond to the locations of bonded areas 170 between subchambers 132 of chamber 130 in FIG. 5. As a result, insert 620 may include indentations 622, 624, 626 and projections 623, 625 having locations and shapes that correspond to a surface of a fluid-filled chamber and thus assist to fit or join insert 620 to the fluid-filled chamber.

Figure 16:
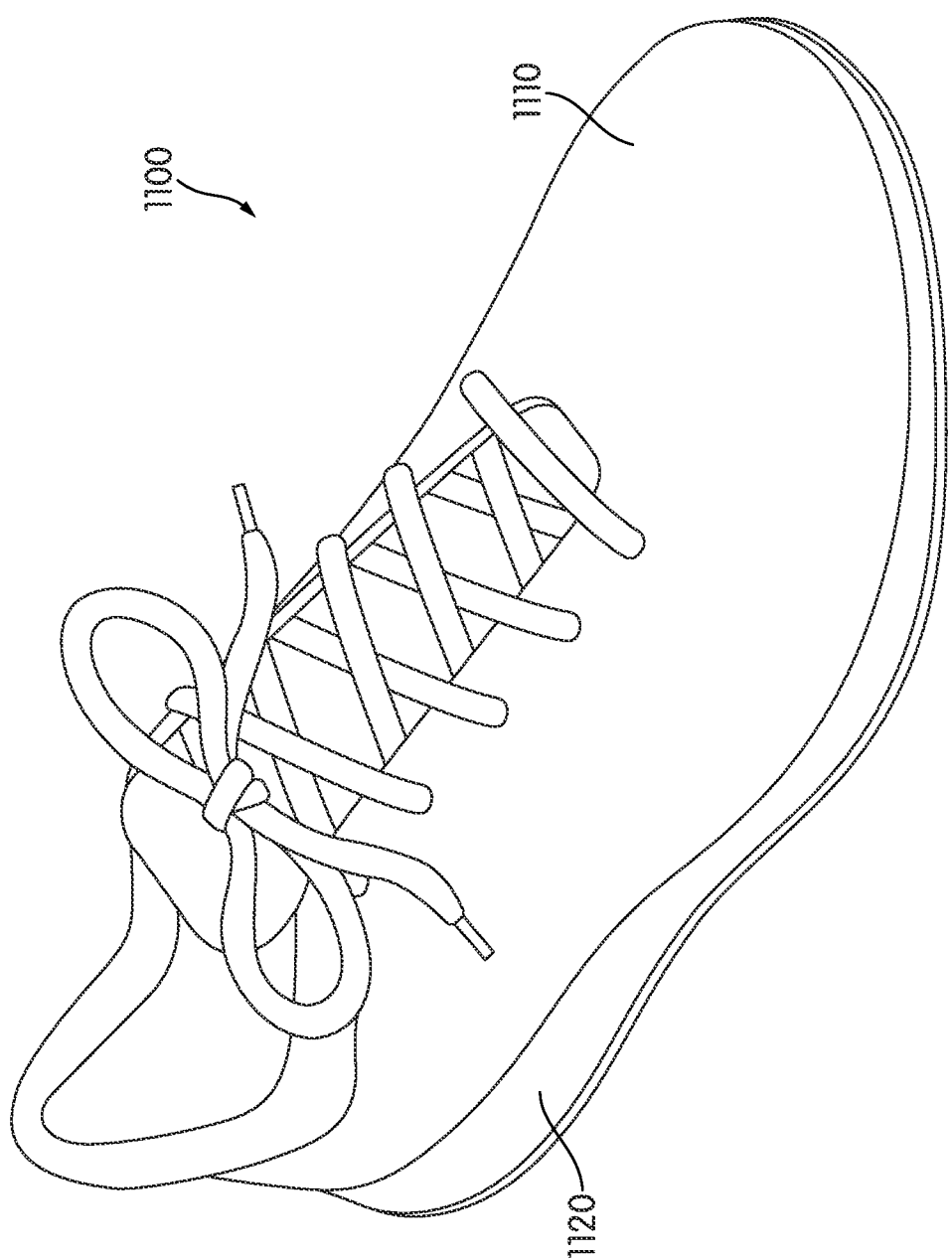
FIG. 16 is a perspective view of an article of footwear.
Figure 17:
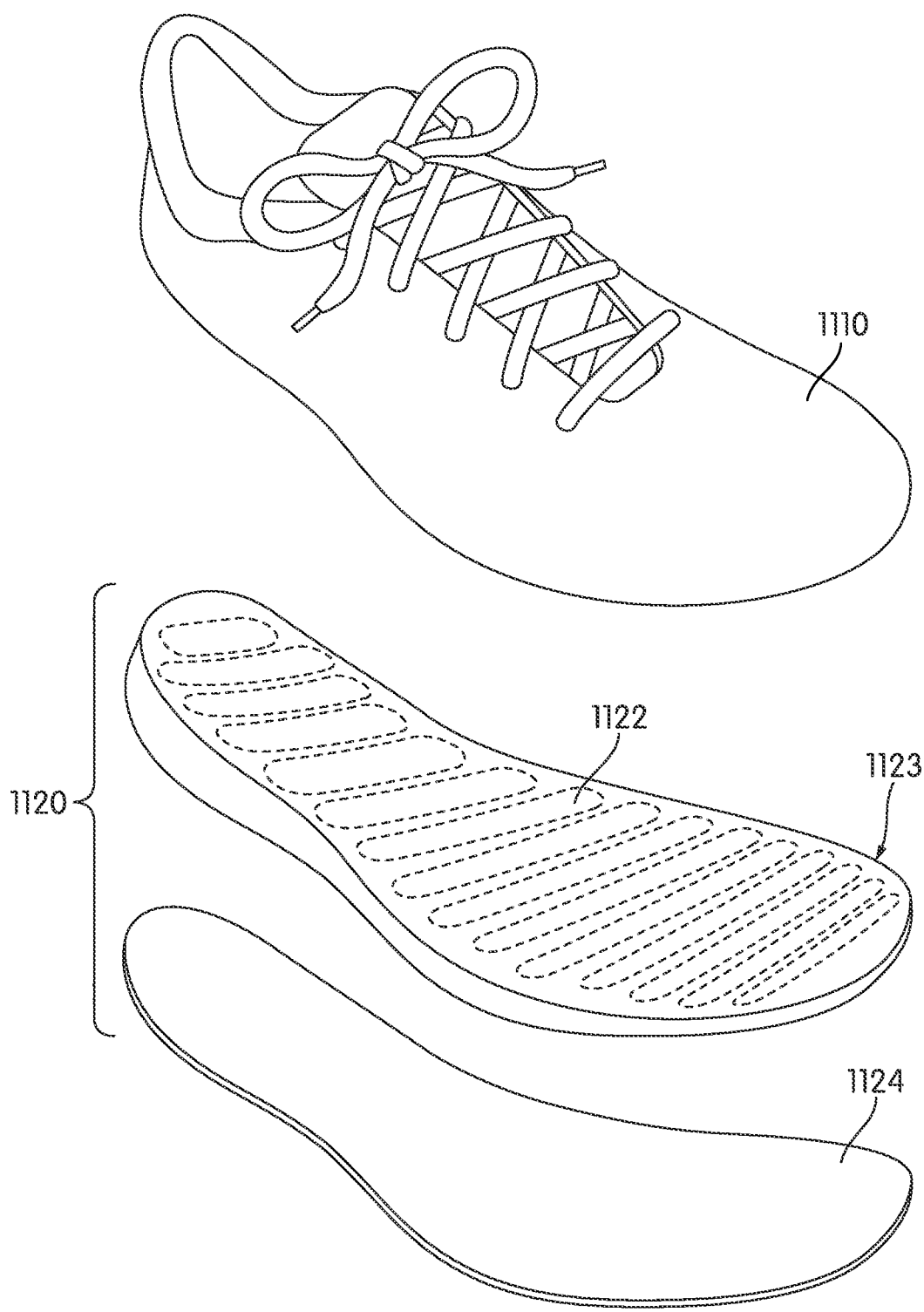
FIG. 17 is an exploded perspective view of the article of footwear of FIG. 16.

Other alternative arrangements and configurations for a chamber may be provided. For example, a chamber may be located outside of a void within an article of footwear. As shown in FIG. 16, an article of footwear 1100 may include an upper 1110 and a sole structure 1120. However, instead of locating a chamber 1122 within a void that is at least partially formed by upper 1110, as with chamber 130 shown in FIG. 2, chamber 1122 may be located inside a midsole 1123 that is secured to a bottom surface of upper 1110, as shown in FIG. 17. Chamber 1122 may be provided as a fluid-filled chamber according to the configurations described herein and may be provided in combination with other components discussed herein. For instance, chamber 1122 may include all of the features of chamber 130. Chamber 1122 may be provided as a fluid-filled chamber in combination with foam, such as a fluid-filled chamber 1122 encapsulated in foam to provide midsole 1123 that is joined to a bottom surface of upper 1110. An outsole 1124 may also be provided on a bottom surface of chamber 1122, as shown in the example of FIG. 17.

Figure 18:
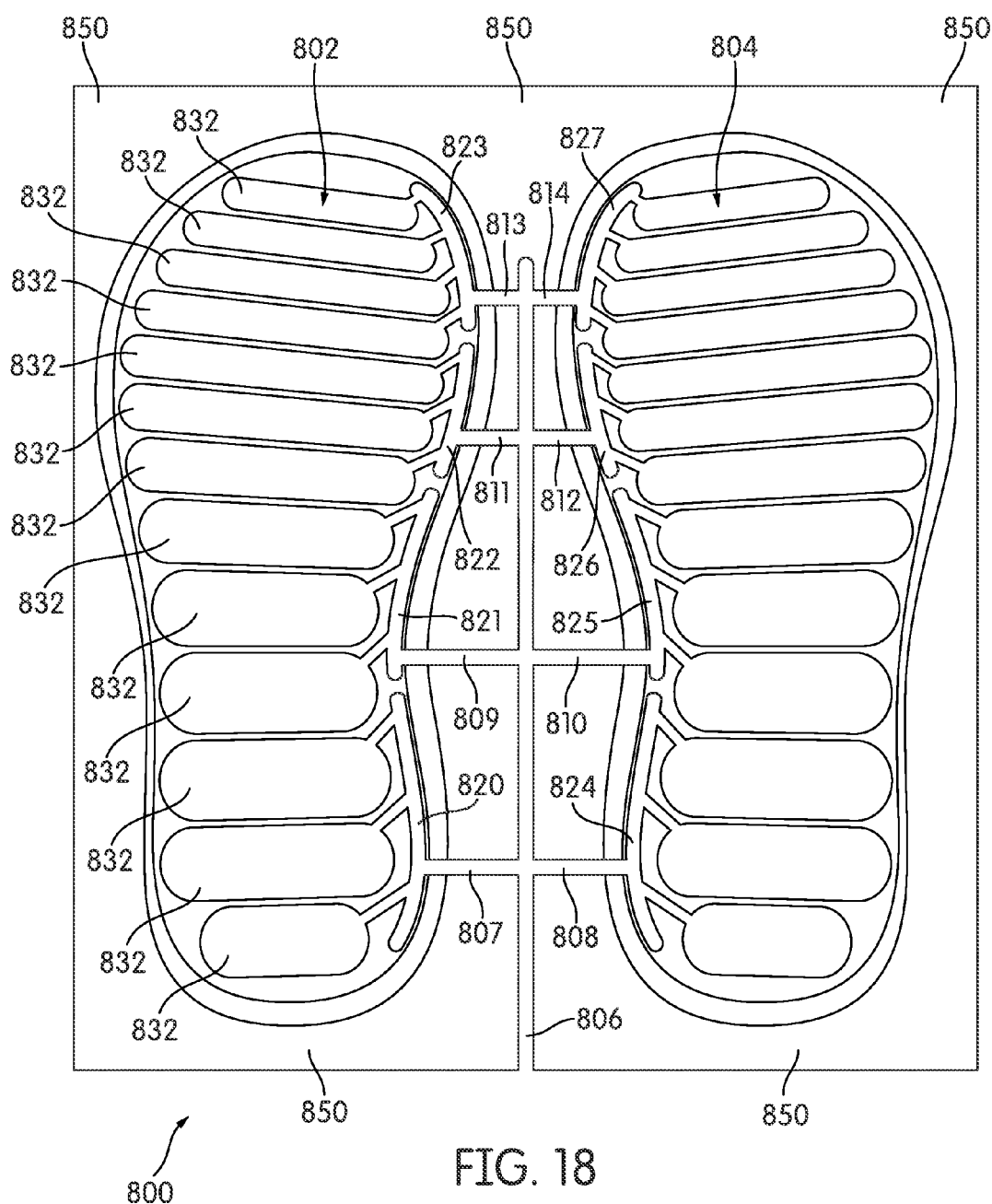
FIG. 18 is a top plan view of a product of a molding process to produce a fluid-filled chamber.

According to one configuration, a chamber may include a plurality of manifolds connected to subchambers. Turning to FIG. 18, a product 800 of a molding process may include a first chamber 802 and a second chamber 804 surrounded by a bonded area 850. First chamber 802 may include manifolds 820-823 and second chamber 804 may include manifolds 824-827. Manifolds 820-827 may be connected to subchambers of first chamber 802 and second chamber 804, as shown in FIG. 18.

Product 800 may further include a main conduit with secondary conduits connected to the plurality of manifolds that supply pressurized fluid to chambers. As shown in the example of FIG. 18, product 800 may include a main conduit 806 with a secondary conduit 807 connected to manifold 820, a secondary conduit 808 connected to manifold 824, a secondary conduit 809 connected to manifold 821, a secondary conduit 810 connected to manifold 825, a secondary conduit 811 connected to manifold 822, a secondary conduit 812 connected to manifold 826, a secondary conduit 812 connected to manifold 823, and a secondary conduit 814 connected to manifold 827. Thus, when pressurized fluid is supplied via main conduit 806, the pressurized fluid may then be distributed to secondary conduits 807, 809, 811, 813, which in turn distribute the pressurized fluid to manifolds 820-823 and then to subchambers 832 of first chamber 802. Similarly, pressurized fluid may be distributed to secondary conduits 808, 810, 812, 814, which in turn distribute the pressurized fluid to manifolds 824-827 and the subchambers of second chamber 804.

Providing a chamber with a plurality of manifolds may assist with filling the subchambers of a chamber or groups of subchambers at different pressures. If it is desired to provide subchambers or groups of subchambers at various pressures, manifolds may be sealed to provide a group of subchambers at a given pressure or individual connections between manifolds and subchambers may be sealed to provide subchambers at selected pressures. For example, pressurized fluid at a first pressure may be supplied via main conduit 806 and secondary conduits 807, 809, 811, 813 to manifolds 821-823 and subchambers 832 of first chamber 802. If it is desired, for example, to provide subchambers 832 connected to manifold 823 at the first pressure, a seal may be formed between manifold 823 and secondary conduit 813. Pressurized fluid at a second, different pressure may then be supplied to manifolds 820-822 and a seal may then be formed between a selected manifold and a secondary conduit to provide a second group of subchambers at a second pressure. This process may be repeated, as desired, to provide additional groups of subchambers at different pressures.

Alternatively, individual seals may be provided between subchambers and their respective manifolds after supplying pressurized fluid at a desired pressure. For example, a first pressure may be supplied to manifold 823 and subchambers 832 via secondary conduit 813 and a seal may then be formed between subchamber 843 and manifold 823. Pressurized fluid at a second pressure may then be supplied to manifold 823 and subchambers 832 connected to manifold 823 and a seal may then be formed between one other subchambers 832 connected to manifold 832 and manifold 823. Pressurized fluid at a third pressure may then be supplied to manifold 823 and the remaining subchambers 832 connected to manifold 823, and a seal may then be formed between one of the remaining subchambers 822 and manifold 823. This process may be repeated for other subchambers and other manifolds and their respective subchambers.

Figure 19:
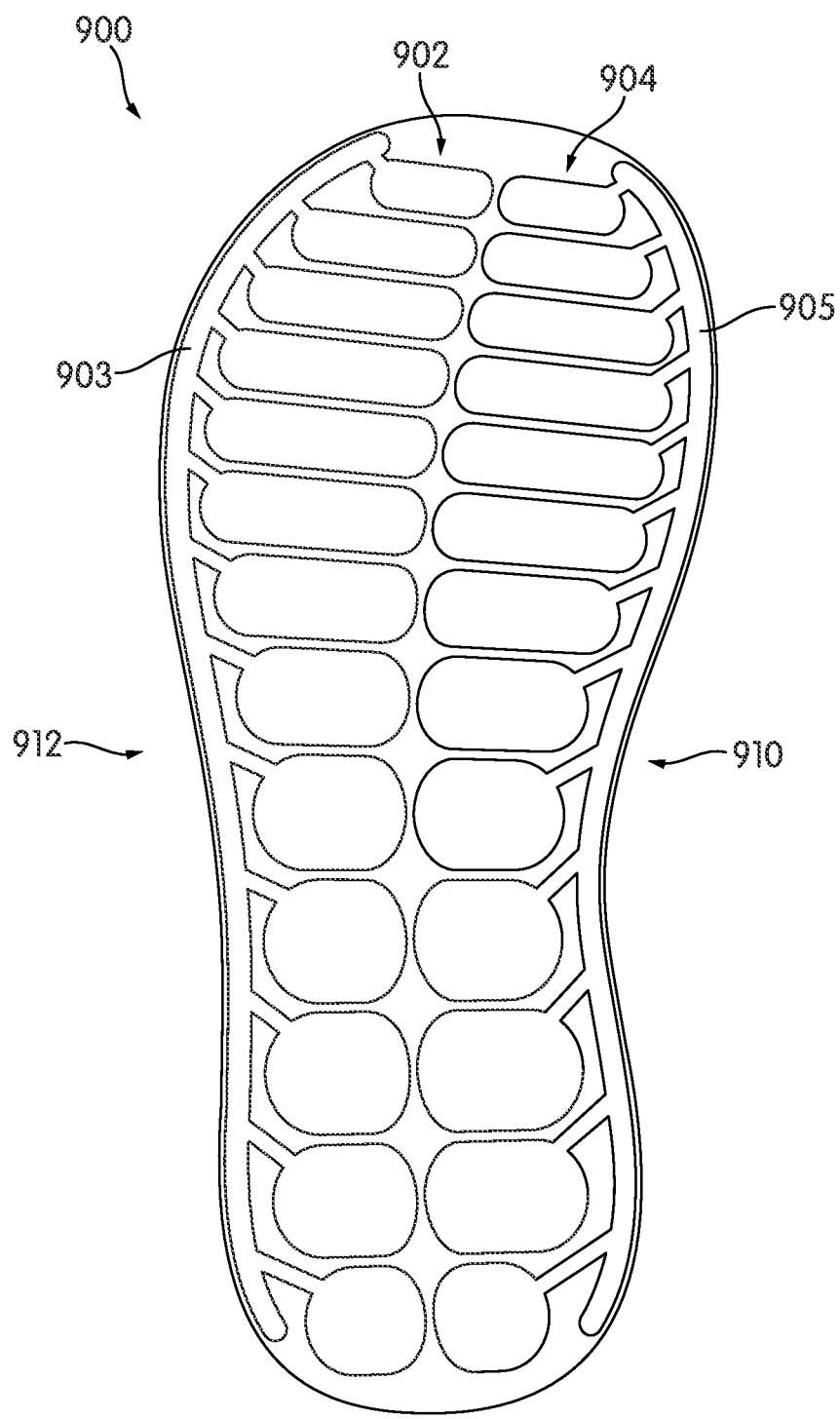
FIG. 19 is a top plan view of a fluid-filled chamber.

According to one configuration, a chamber 900 may include a first manifold 903 and a second manifold 905 that respectively supply pressurized fluid to a first group 902 of subchambers and a second group of subchambers 904, as shown in FIG. 19. First manifold 903 and first group 902 of subchambers may be arranged on lateral side 912 of chamber 900, while second manifold 905 and second group 904 of subchambers may be arranged on medial side 910 of chamber 900, as shown in FIG. 19. According to another example, either or both of first manifold 903 and second manifold 905 may be located between first group 902 of subchambers and second group 904 of subchambers instead of along the medial and lateral sides of chamber 900. According to one configuration, pressurized fluid at different pressures may be supplied to manifolds 903, 905 so that first group 902 of subchambers and second group 904 of subchambers enclosed pressurized fluid at different pressures.

Figure 20:
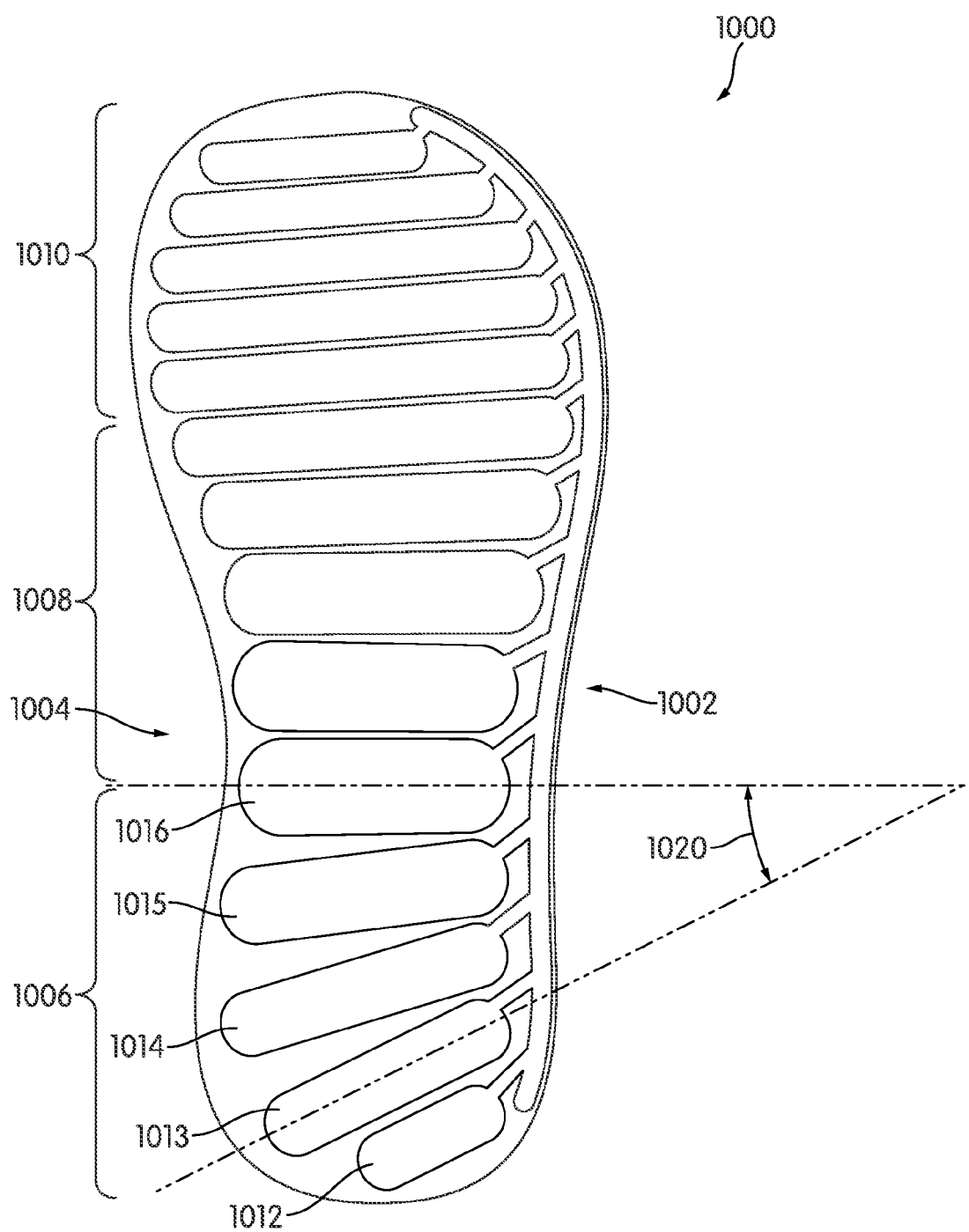
FIG. 20 is a top plan view of a fluid-filled chamber.

According to one configuration, subchambers of a chamber may extend substantially straight across a chamber in a medial to lateral direction. Such a direction may be, for example, substantially perpendicular to a longitudinal axis of a chamber. According to another configuration, one or more subchambers of a chamber may be angled relative to the medial to lateral direction. For example, one or more subchambers 1012-1016 in a heel region 1006 of a chamber 1000 may be oriented at an angle 1020 relative to the medial to lateral direction extending between lateral side 1002 and medial side 1004 of chamber 1000, as shown in the example of FIG. 20.

For instance, subchamber 1016 may extend substantially straight across chamber 1000 in a direction extending from lateral side 1002 to medial side 1004 of chamber. The extending direction of subchamber 1016 may be substantially perpendicular to a longitudinal axis of chamber 1000 that extends between the heel region 1006 and forefoot region 1010 of chamber 1000. Conversely, subchamber 1013 may extend between lateral side 1002 and medial side 1004 at angle 1020 relative to the direction that subchamber 1016 extends between lateral side 1002 and medial side 1004. Angle 1020 may vary from subchamber to subchamber or may be substantially the same from subchamber to subchamber. Angle 1020 may be, for example, approximately 10-60°.

According to one configuration, any of subchambers 1012, 1014, 1015, and 1016 may also extend at an angle relative a generally straight direction between lateral side 1002 and medial side 1004 of chamber 1000. The angle at which subchambers 1012, 1014, 1015, 1016 are oriented may fall within the range of approximately 10-60°, like angle 1020. As shown in the example of FIG. 20, the angles at which subchambers 1012-1016 are angled relative to a generally straight direction between lateral side 1002 and medial side 1004 of chamber 1000 may vary from subchamber to subchamber. For instance, the angle at which subchambers 1012-1016 are oriented relative to a generally straight direction between lateral side 1002 and medial side 1004 of chamber 1000 may decrease from subchamber 1012 to subchamber 1016, as shown in FIG. 20, with subchamber 1012 being oriented at the largest angle and subchamber 1016 being substantially oriented along the generally straight direction between lateral side 1002 and medial side 1004 of chamber 1000. According to one configuration, midfoot region 1008 and/or forefoot region 1010 may also include one or more angled subchambers, like subchambers 1012-1015 of heel region 1006 in FIG. 20.

Providing one or more angled tubes may provide support for a foot of a footwear wearer who experiences pronation during movement. For example, when an article of footwear including chamber 1000 is planted on a ground surface during movement of a wearer who experiences pronation, the lateral side 1002 of heel region 1006 may strike a ground surface first. As the wearer moves forward, the footwear would roll forward towards midfoot region 1008 and forefoot region, but the footwear would also pronate from lateral side 1002 to medial side 1004. Because of the movement from lateral side 1002 to medial side 1004 due to pronation, angled subchambers may advantageously provide enhanced support to a foot during pronation, such as by being generally aligned with the rolling movement of a wearer's foot from heel to forefoot and the pronating movement of a wearer's foot from lateral side to medial side. For instance, subchambers 1012-1016 in heel region 1006 of chamber 1000 may be progressively oriented at an angle relative to a generally straight direction between lateral side 1002 and medial side 1004 of chamber 1000 towards the heel of chamber, as shown in FIG. 20, so that as the foot rolls forward and pronates from lateral side 1002 to medial side 1004, subchambers 1012-1016 will have orientations and positions corresponding to the movement of the foot.

Chambers described herein may include a upper barrier layer and a lower barrier layer that are substantially impermeable to a pressurized fluid contained by the chamber. For example, sheet 400 and sheet 402 shown in the molding process depicted in FIGS. 9 and 10, may respectively serve as an upper barrier layer and a lower barrier layer. The upper barrier layer and the lower barrier layer may be provided as sheets having the same thickness or different thicknesses. For example, each of upper barrier layer and lower barrier layer may have a thickness of approximately 0.060 to 0.40 inches (approximately 1.5 to 10 mm). In another example, each of upper barrier layer and lower barrier layer may have a thickness of approximately 0.10 to 0.30 inches (approximately 2.5 to 7.6 mm). In another example, each of upper barrier layer and lower barrier layer may have a thickness of approximately 0.020 to 0.030 inches (approximately 0.50 to 0.76 mm). In another example, each of upper barrier layer and lower barrier layer may have a thickness of approximately 0.025 inches (approximately 0.64 mm).

Upper barrier layer and lower barrier layer are bonded together around their respective peripheries to form a peripheral bond, such as bonded region 170 of chamber 130, and cooperatively form a sealed chamber in which the pressurized fluid is located. The pressurized fluid contained by chamber 130 may induce an outward force upon barrier layers that tends to separate or otherwise press outward upon barrier layers, thereby distending barrier layers, such as to form subchambers 131-143, connections 151-163, and manifold 150. In order to restrict the degree of outwardly-directed swelling (i.e., distension) of barrier layers due to the outward force of the pressurized fluid, bonded region 170 is formed between barrier layers.

Fluid-filled chamber 130 may also provide a midsole in combination with other materials or components, such as, for example, a polymer foam material, such as polyurethane or ethylvinylacetate, which may encapsulate the fluid-filled chamber 130. Such a foam material may form a sidewall of the midsole. In addition to the polymer foam material and fluid-filled chamber 130, a midsole may incorporate one or more additional footwear elements that enhance the comfort, performance, or ground reaction force attenuation properties of footwear 100, including plates, moderators, lasting elements, or motion control members, for example. Although absent in some configurations, outer sole 140 is secured to a lower surface of upper 110 and may be formed from a rubber material that provides a durable and wear-resistant surface for engaging the ground.

A wide range of polymer materials may be utilized for the chambers discussed herein. In selecting materials for a chamber, engineering properties of the material (e.g., tensile strength, stretch properties, fatigue characteristics, dynamic modulus, and loss tangent) as well as the ability of the material to prevent the diffusion of the fluid contained by the chamber may be considered. When formed of thermoplastic urethane, for example, a chamber wall may have a thickness of approximately 1.0 millimeter, but the thickness may range from 0.2 to 4.0 millimeters or more, for example. In addition to thermoplastic urethane, examples of polymer materials that may be suitable for a chamber include polyurethane, polyester, polyester polyurethane, and polyether polyurethane. Chamber 200 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein layers include ethylene-vinyl alcohol copolymer, thermoplastic polyurethane, and a regrind material of the ethylene-vinyl alcohol copolymer and thermoplastic polyurethane. Another suitable material for a chamber is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al.

The fluid within a chamber may be pressurized between zero and three-hundred-fifty kilopascals (i.e., approximately fifty-one pounds per square inch) or more. In addition to air and nitrogen, the fluid may include octafluorapropane or be any of the gasses disclosed in U.S. Pat. No. 4,340,626 to Rudy, such as hexafluoroethane and sulfur hexafluoride. In some configurations, a chamber may incorporate a valve or other structure that permits the wearer to adjust the pressure of the fluid.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. An article of footwear including a heel region and a forefoot region, the article of footwear comprising:

an upper forming a first portion of a void within the footwear;

a sole structure secured to the upper, the sole structure forming a second portion of the void; and a chamber that encloses a pressurized fluid and includes a longitudinal axis that extends between the heel region and the forefoot region, the chamber being located within the void and including a first plurality of fluid-filled subchambers that extend in a medial to lateral direction of the footwear along individual longitudinal axes that are perpendicular to the longitudinal axis of the chamber, and a manifold that extends continuously along one of a medial side and a lateral side of the sole structure from a first end of the chamber disposed in the heel region to a second end of the chamber disposed in the forefoot region, the manifold being in fluid communication with the first plurality of fluid-filled subchambers, and the manifold is intersected by the longitudinal axes of the first plurality of fluid-filled subchambers at a same edge of the manifold, each of the first plurality of fluid-filled subchambers being fluidly connected to the manifold by a respective individual fluid connection;

wherein each respective individual fluid connection, in a direction from a toe end of the chamber toward a heel end of the chamber, is successively farther in distance from the toe end of the chamber; and wherein a cross-sectional area of each individual fluid connection is less than a cross-sectional area of the individual fluid connection's respective fluid-filled subchamber.

2. The article of footwear of claim 1, wherein the upper includes an ankle opening and the chamber is removable through the ankle opening.

3. The article of footwear of claim 1, wherein the first plurality of fluid-filled subchambers form a majority of the chamber.

4. The article of footwear of claim 1, wherein the first plurality of fluid-filled subchambers are separated from one another in a direction extending between the forefoot region and the heel region of the footwear.

5. The article of footwear of claim 4, wherein the first plurality of fluid-filled subchambers are separated from one another by portions of a bonded area that extends between the lateral side and the medial side of the footwear.

6. The article of footwear of claim 1, further comprising an insert located on a top surface of the chamber.

7. The article of footwear of claim 6, wherein the insert extends along a periphery of the chamber.

8. The article of footwear of claim 7, wherein the insert includes a foam material.

9. The article of footwear of claim 1, further comprising a second plurality of fluid-filled subchambers that are oriented at an angle relative to the longitudinal axes of the first plurality of fluid-filled subchambers, the second plurality of fluid-filled subchambers being in fluid communication with the manifold.

10. An article of footwear including a heel region and a forefoot region, the article of footwear comprising:

an upper forming a first portion of a void within the footwear and including an ankle opening that provides access to the void;

a sole structure secured to the upper and forming a second portion of the void;

a chamber that: encloses a pressurized fluid, is located within the void, and includes a longitudinal axis that extends between the heel region and the forefoot region, the chamber including a plurality of subchambers extending between a medial side and a lateral side of the chamber along individual longitudinal axes that extend perpendicular to the longitudinal axis of the chamber and a manifold in fluid communication with the plurality of subchambers and intersected by the individual longitudinal axes at a same edge of the manifold, each of the plurality of subchambers being fluidly connected to the manifold by a respective individual fluid connection; and an insert located on a top surface of the chamber;

wherein the chamber and the insert are removable from the void through the ankle opening;

wherein each respective individual fluid connection, in a direction from a toe end of the chamber toward a heel end of the chamber is, successively farther in distance from the toe end of the chamber; and wherein a cross-sectional area of each individual fluid connection is less than a cross-sectional area of the individual fluid connection's respective subchamber.

11. The article of footwear of claim 10, wherein the plurality of subchambers are separated from each other by a bonded area of the chamber.

12. The article of footwear of claim 11, wherein the plurality of subchambers include a first group of subchambers located in the heel region of the chamber and a second group of subchambers located in the forefoot region of the chamber, the first group of subchambers enclosing the pressurized fluid at a higher pressure than the second group of subchambers.

13. An article of footwear including a heel region and a forefoot region, the article of footwear comprising:

an upper forming a first portion of a void within the footwear and including an ankle opening that provides access to the void;

a sole structure secured to the upper and forming a second portion of the void; and a chamber that: encloses a pressurized fluid, is located within the void, and includes a longitudinal axis that extends between the heel region and the forefoot region, the chamber including a first plurality of fluid-filled subchambers that each include a longitudinal axis that extends in a medial to lateral direction of the footwear and is perpendicular to the longitudinal axis of the chamber, and a manifold in fluid communication with the first plurality of fluid-filled subchambers, the manifold being located along one of a medial side and a lateral side of the chamber, the manifold extending continuously between the heel region and the forefoot region of the footwear, and the manifold being intersected by at least two of the longitudinal axes of the first plurality of fluid-filled subchambers at a same edge of the manifold;

wherein each of the first plurality of fluid-filled subchambers is fluidly connected to the manifold by a respective individual fluid connection;

wherein each respective individual fluid connection, in a direction from a toe end of the chamber toward a heel end of the chamber is, successively farther in distance from the toe end of the chamber; and wherein a cross-sectional area of each individual fluid connection is less than a cross-sectional area of the individual fluid connection's respective fluid-filled subchamber.

14. The article of footwear of claim 13, further comprising a second plurality of fluid-filled subchambers that each include a longitudinal axis that extends in a medial to lateral direction of the footwear and is oriented at an angle relative to the longitudinal axes of the first plurality of fluid-filled subchambers.

15. The article of footwear of claim 13, further comprising an insert located on a top surface of the chamber.

16. The article of footwear of claim 15, wherein the insert extends along a periphery of the chamber.

17. The article of footwear of claim 13, wherein the chamber includes bonds that extend in the medial to lateral direction and are located between adjacent ones of the first plurality of fluid-filled subchambers.

* * * * *